(12) United States Patent
Ibrahim et al.

(10) Patent No.: US 12,348,445 B2
(45) Date of Patent: Jul. 1, 2025

(54) PRECODED REFERENCE SIGNALS FOR CROSS LINK INTERFERENCE FEEDBACK REPORTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Seyedkianoush Hosseini, San Diego, CA (US); Ahmed Attia Abotabl, San Diego, CA (US); Krishna Kiran Mukkavilli, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/859,839

(22) Filed: Jul. 7, 2022

(65) Prior Publication Data

US 2024/0014962 A1    Jan. 11, 2024

(51) Int. Cl.
*H04L 5/00* (2006.01)
*H04W 24/00* (2009.01)
*H04W 24/08* (2009.01)

(52) U.S. Cl.
CPC ........... *H04L 5/0048* (2013.01); *H04W 24/08* (2013.01)

(58) Field of Classification Search
CPC .. H04L 5/0058; H04W 24/08; H04B 7/06954; H04B 7/0452
See application file for complete search history.

(56) References Cited

U.S. PATENT DOCUMENTS

| | | | |
|---|---|---|---|
| 2014/0112168 A1* | 4/2014 | Chen ..................... | H04W 72/23 370/252 |
| 2018/0097595 A1* | 4/2018 | Huang .................. | H04L 1/0009 |
| 2019/0223074 A1* | 7/2019 | Nammi ................ | H04B 7/0689 |
| 2020/0213052 A1* | 7/2020 | Li ......................... | H04W 72/23 |
| 2020/0389805 A1 | 12/2020 | Kim et al. | |
| 2021/0050983 A1* | 2/2021 | Manolakos ........... | H04W 24/10 |
| 2021/0306220 A1* | 9/2021 | Xu ....................... | H04L 41/0806 |
| 2022/0060265 A1* | 2/2022 | Xu ........................ | H04L 5/0094 |
| 2022/0095144 A1* | 3/2022 | Ren ...................... | H04W 72/20 |
| 2022/0095309 A1* | 3/2022 | MolavianJazi ..... | H04W 72/541 |
| 2022/0159596 A1 | 5/2022 | Kim et al. | |
| 2023/0030518 A1* | 2/2023 | Ren ..................... | H04W 52/243 |
| 2023/0217429 A1* | 7/2023 | Faxér .................... | H04L 5/0051 370/329 |

FOREIGN PATENT DOCUMENTS

WO    2018126792 A1    7/2018

OTHER PUBLICATIONS

International Search Report and Written Opinion—PCT/US2023/025201—ISA/EPO—Sep. 12, 2023.

* cited by examiner

*Primary Examiner* — Rasheed Gidado
(74) *Attorney, Agent, or Firm* — Patterson+ Sheridan, L.L.P.

(57) ABSTRACT

Certain aspects of the present disclosure provide techniques for wireless communication by an aggressor user equipment (UE), generally including receiving configuration information configuring the aggressor UE with at least one resource for transmitting precoded reference signals (RS) for cross link interference (CLI) measurement by a victim UE and transmitting the precoded RS on the resource.

27 Claims, 19 Drawing Sheets

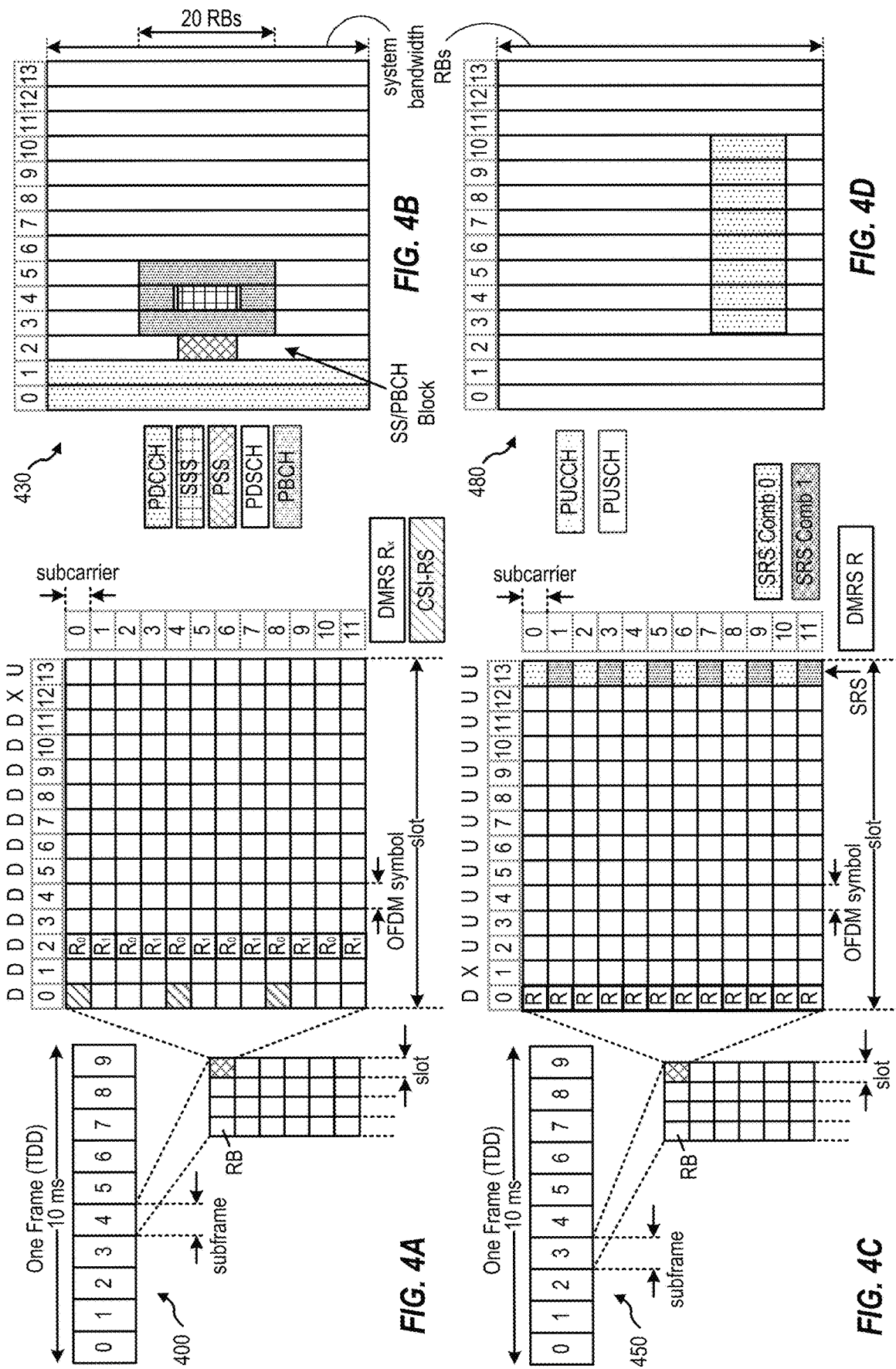

PRECODED REFERENCE SIGNALS FOR CROSS LINK INTERFERENCE FEEDBACK REPORTING

BACKGROUND

Field of the Disclosure

Aspects of the present disclosure relate to wireless communications, and more particularly, to techniques for using precoded reference signals for cross-link interference (CLI) feedback reporting.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by an aggressor user equipment (UE). The method includes receiving configuration information configuring the aggressor UE with at least one resource for transmitting precoded reference signals (RS) for cross link interference (CLI) measurement by a victim UE; and transmitting the precoded RS on the resource.

Another aspect provides a method of wireless communication by a victim UE. The method includes receiving configuration information configuring the victim UE with one or more CLI measurement resources for measuring CLI sounding reference signals (SRS); measuring CLI based on SRS transmitted on the CLI measurement resources; and transmitting a report based on the measured CLI.

Another aspect provides a method of wireless communication by a network entity. The method includes transmitting first configuration information configuring an aggressor UE with at least one resource for transmitting precoded RS for CLI measurement by a victim UE; transmitting second configuration information configuring the victim UE with one or more CLI measurement resources for measuring CLI SRS; and receiving a report, generated by the victim UE, based on measured CLI SRS.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

DETAILED DESCRIPTION

Aspects of the present disclosure provide apparatuses, methods, processing systems, and computer-readable mediums for using precoded reference signals for cross link interference (CLI) feedback reporting.

The term full duplex (FD) describes simultaneous data transmission and receptions over one channel. An FD device is, thus, capable of bi-directional network data transmissions at the same time. In contrast, a half-duplex (HD) devices can only transmit in one direction at one time. With HD mode, data can move in two directions, but not at the same time.

If a user equipment (UE) is operating in HD mode and a gNodeB (gNB) is operating in sub-band FD (SBFD) or in-band FD (IBFD), interference may occur at the UE from a number of sources. For example, this interference may include inter-cell interference (ICI) from other gNBs, intra-cell cross-link interference (CLI) from UEs in the same cell, and inter-cell CLI from UEs in adjacent cells. Self-interference may also occur for FD UEs, where a UEs uplink transmission interference with reception of a downlink transmission. These sources of interference may cause significant issues, including decreased spectral efficiency, increased power consumption, and poor UE performance.

Aspects of the present disclosure provide techniques that may help detect such potential sources of interference. In some cases, an aggressor UE may be configured to transmit precoded CLI-reference signals (CLI-RS), essentially mimicking a future physical uplink shared channel (PUSCH) transmission, and a victim UE to perform CLI measurements based on the transmitted precoded CLI-RS. These techniques will enable improved channel state feedback (CSF) computation at the victim UE, allowing gNB to receive accurate CSF reporting, capturing the impact of inter-UE CLI in FD slots.

The techniques presented herein may have significant benefits. For example, transmission of precoded CLI-RS by an aggressor UE, and subsequent CLI measurement and CSF reporting of the CLI measurement to a network entity may enable the network to generate precoding configurations (e.g., transmitted precoding matrix indicator (TPMI)) that would reduce interference (e.g., intra-cell CLI and inter-cell CLI), improving spectral efficiency, power savings, and UE performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
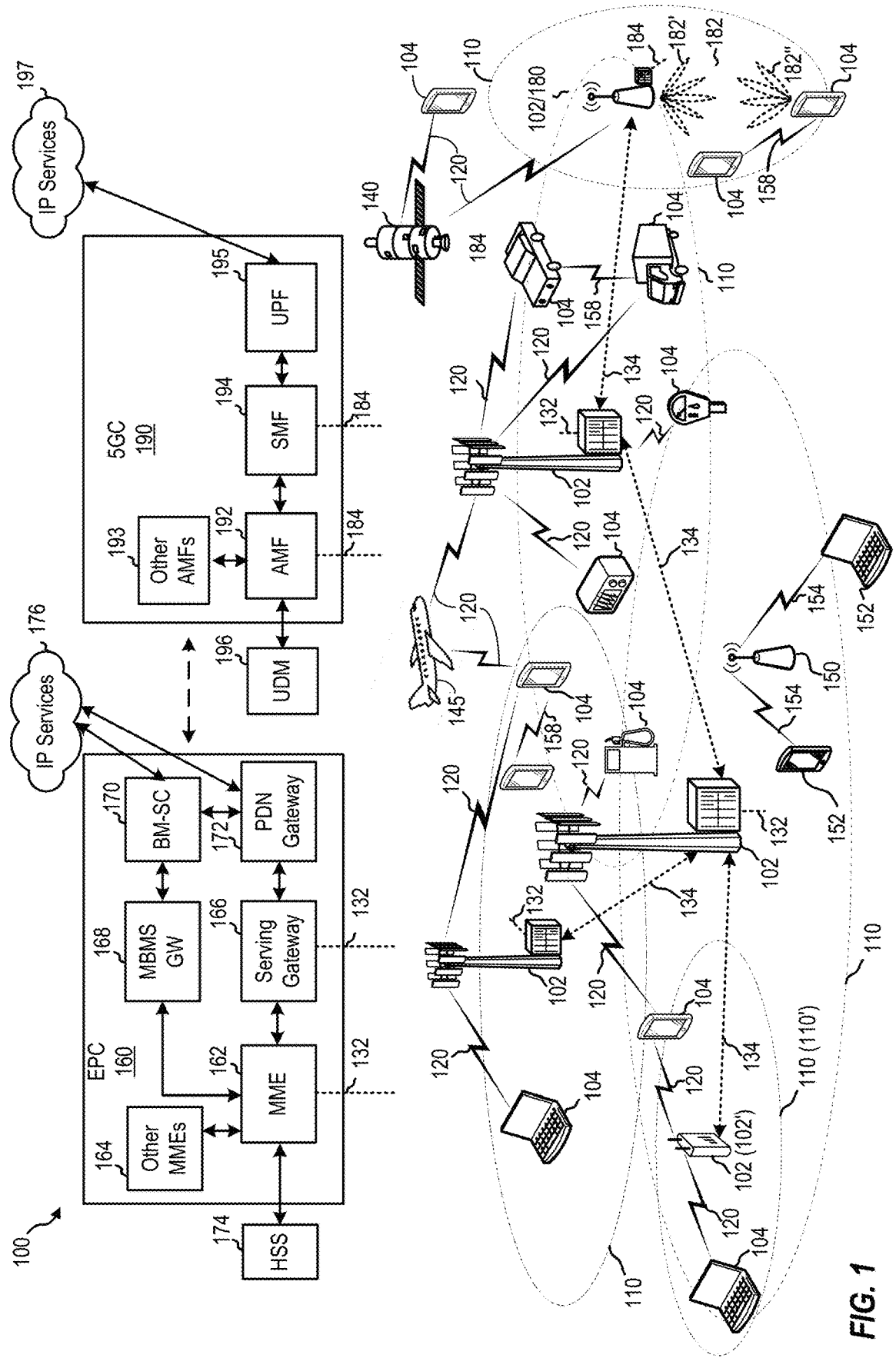
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
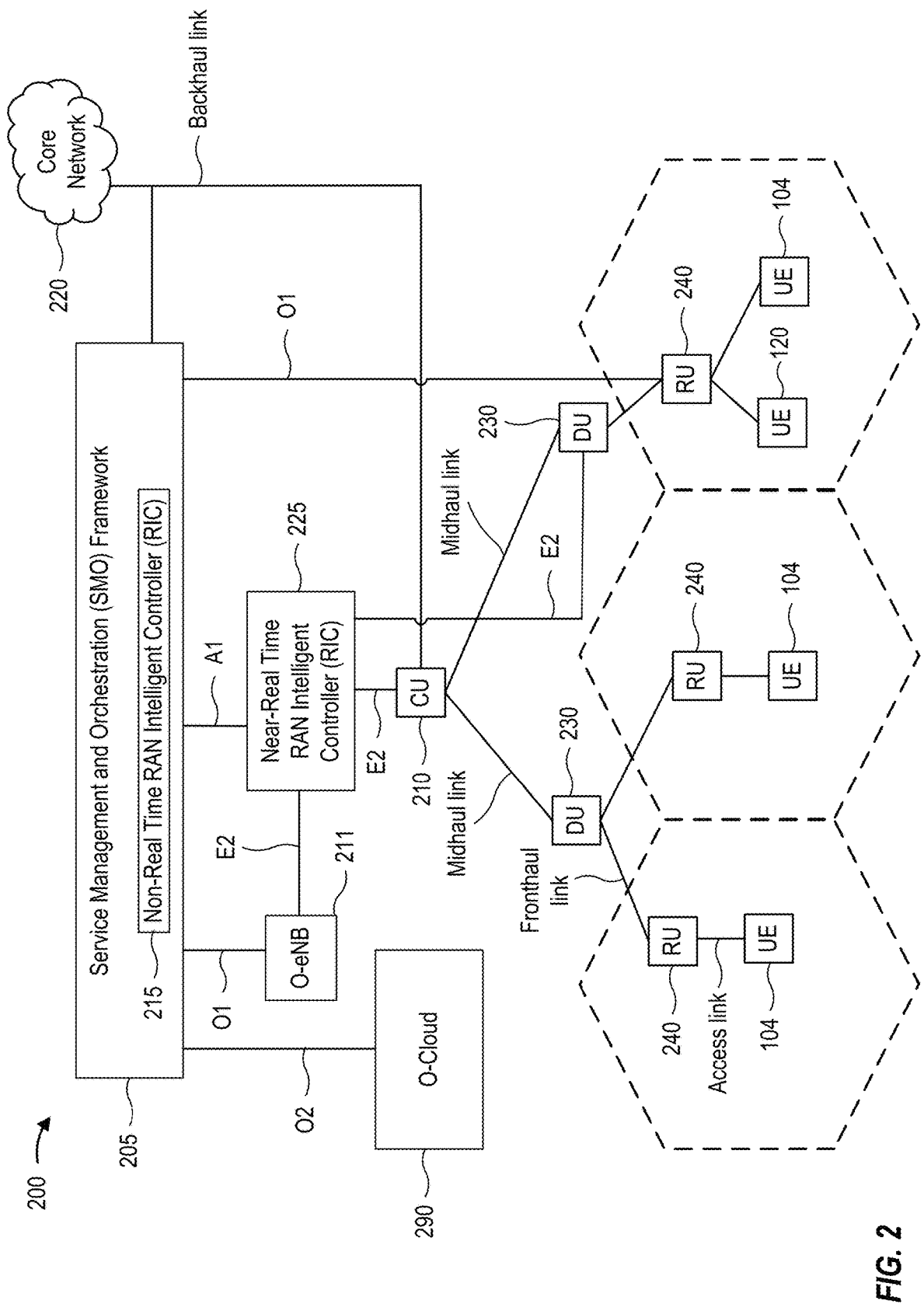
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5GNR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
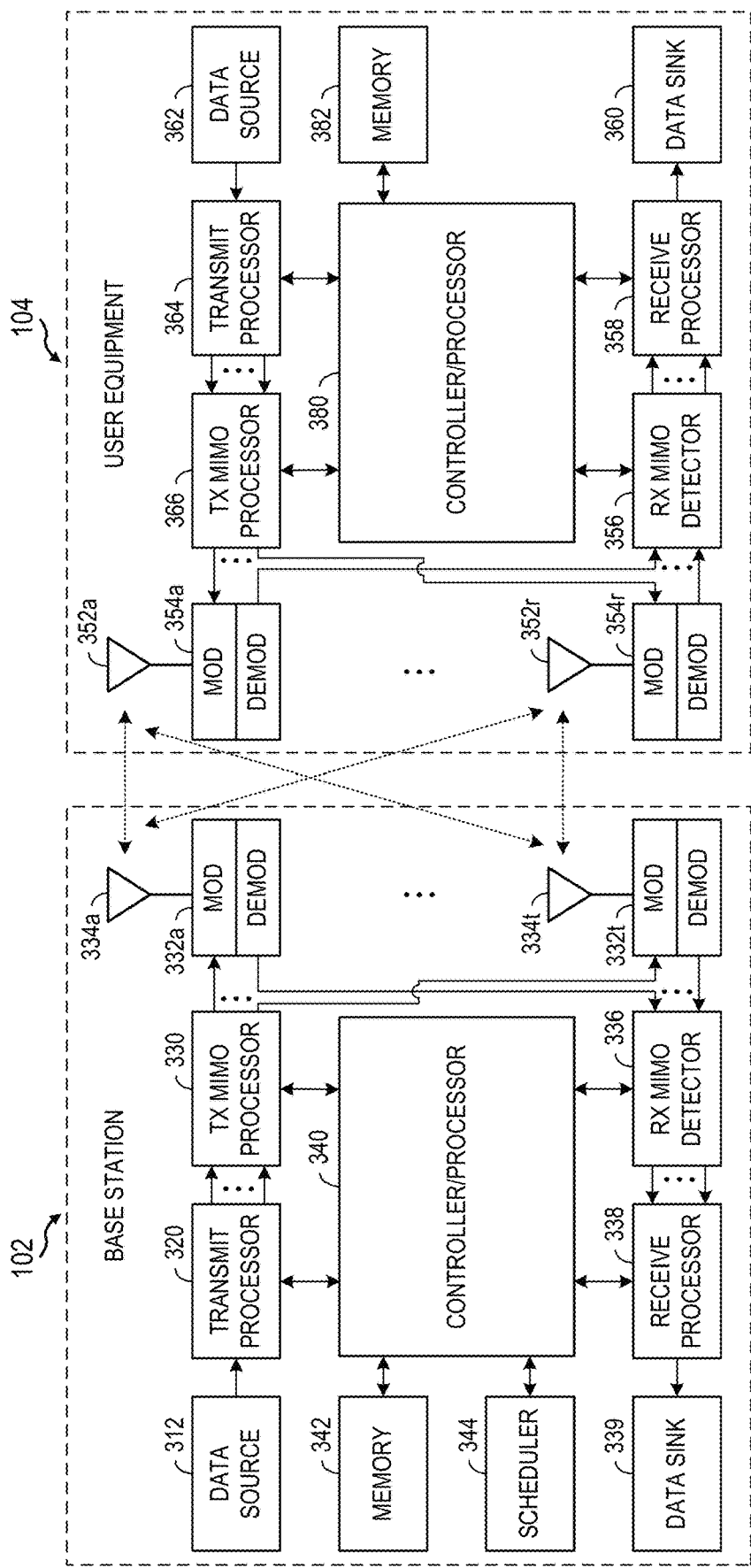
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5GNNR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu} \times 15$ kHz, where is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Full Duplex Communication

As noted above, full-duplex (FD) device is capable of bi-directional network data transmissions at the same time. In contrast, a half-duplex (HD) devices can only transmit in one direction at one time. With HD mode, data can move in two directions, but not at the same time.

Figure 5A:
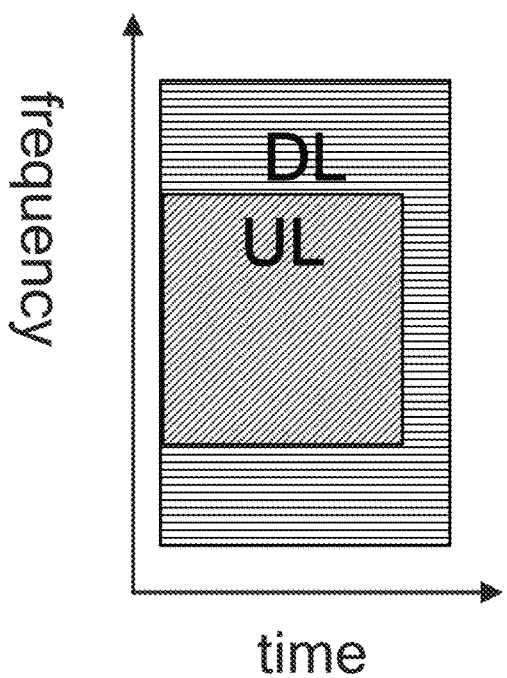
FIGS. 5A, 5B, and 5C depict various examples of full duplex time/frequency resource configurations.
Figure 5B:
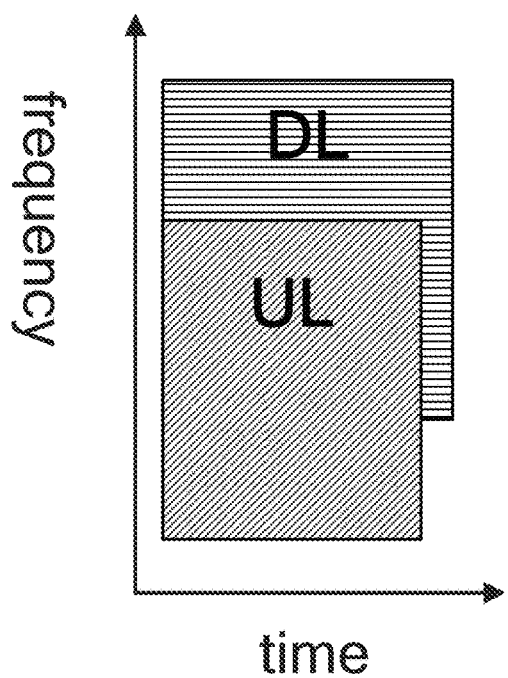

Examples of FD communication include in-band FD (IBFD) and sub-band FD. As illustrated in FIGS. 5A and 5B, with IBFD, a device may transmit and receive on the same time and frequency resources. In this case, the downlink (DL) and uplink (UL) shares the same IBFD time and frequency resources which may fully overlap (FIG. 5A) or partially overlap (FIG. 5B).

Figure 5C:
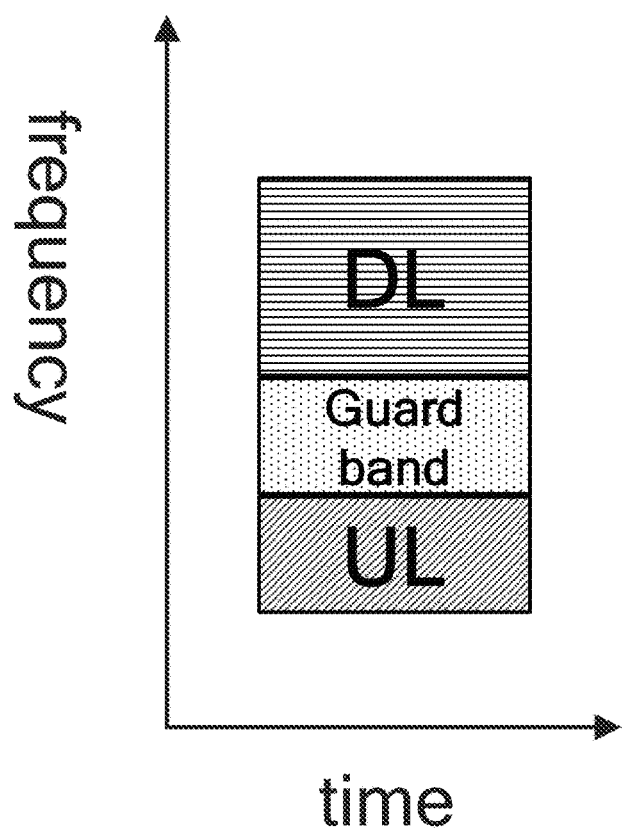

As shown in FIG. 5C, with SBFD (also referred to a flexible duplexing), a device may transmit and receive at the same time, but using different frequency resources. In this case, the DL resource may be separated from the UL resource, in frequency domain, by a guard band.

Interference to a UE and/or a network entity (e.g., a base station such as a gNB or node of a disaggregated base station) operating in FD mode may come in the form of CLI from neighboring nodes, as well as self-interference (SI). FIG. 5A, FIG. 5B, FIG. 5C, and FIG. 5D illustrate example interference scenarios for various FD communication use cases.

Figure 6A:
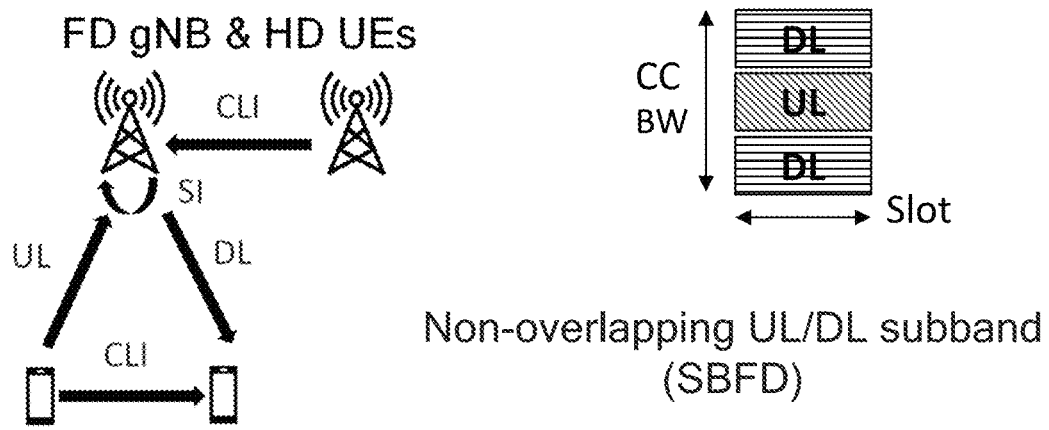
FIGS. 6A, 6B, and 6C depict various examples of full duplex configurations.

As illustrated in FIG. 6A, a first scenario is when FD is enabled for a gNB (e.g., with non-overlapping UL/DL subbands) but disabled for each connected UE (which in turn may be enabled for half-duplex (HD) communication), a gNB communicates using FD capabilities. In this case, CLI between UEs, SI from the FD gNB, and CLI between the gNB and neighboring gNBs interferes with FD communication.

Figures 6B, 6C:
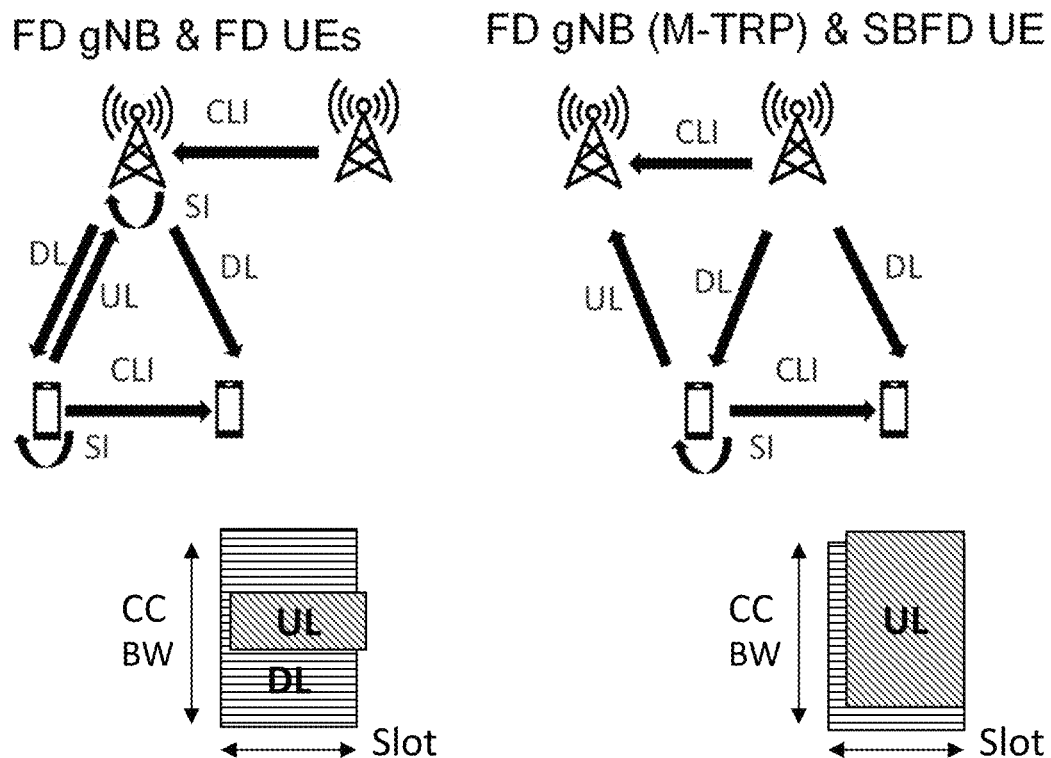

As illustrated in FIG. 6B, a second scenario is when FD is enabled for both a gNB and a FD UE/customer premise equipment (CPE) connected to the gNB, the gNB communicates with the FD UE using FD capabilities. If the gNB is connected to a HD UE alongside the FD UE, the gNB communicates with the HD UE. In this case, CLI between UEs, SI from the gNB and the FD UE, and CLI between the FD gNB and neighboring gNBs interferes with FD communication.

As illustrated in FIG. 6C, a third scenario is when FD is enabled for two gNBs (e.g., in a multiple TRP scenario) and enabled at one UE/CPE connected to the two gNBs. in this case, the two gNBs may communicate with the FD UE using FD capabilities. If one of the two gNBs is connected to an HD UE alongside the FD UE, the one gNB communicates with both the HD UE and the FD UE. In this case, CLI between UEs, SI from the FD UE, and CLI between the two gNBs may interfere with FD communication.

Figure 7A:
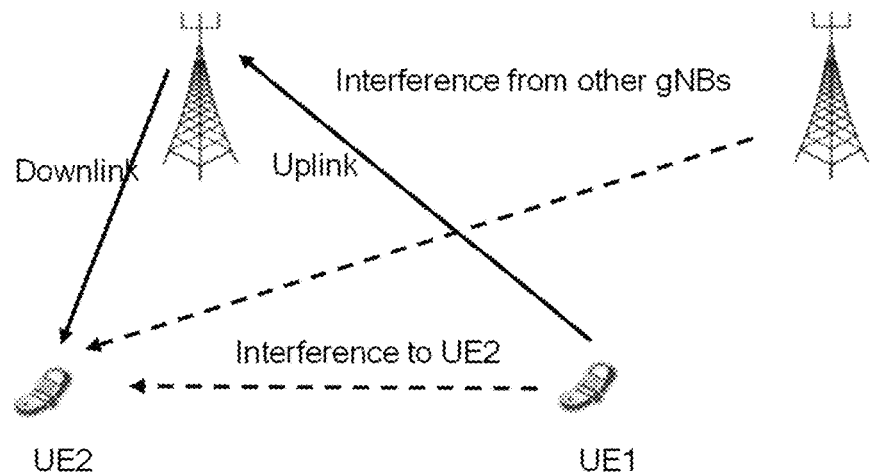
FIGS. 7A and 7B depict examples of sources of interference at a UE.
Figure 7B:
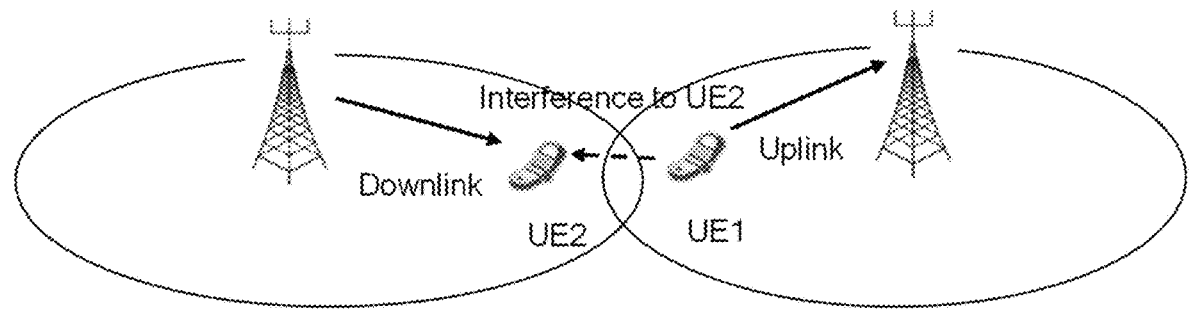

FIGS. 7A and 7B also illustrate various forms of interference for FD communications. As illustrated, if a UE is operating in HD mode and the gNB is operating in FD (mode) SBFD/IBFD, source of interference at the UE include inter-cell interference from other gNBs, intra-cell CLI from UEs in the same cell, and inter-cell CLI from UEs in adjacent cells (as shown in FIG. 7B). Additionally, there may be self-interference for full-duplex UEs.

Overview of Codebook and Non-Codebook Based UL Transmissions

Some deployments support codebook-based transmission and non-codebook-based transmission schemes for uplink transmissions with wideband precoders. Codebook-based UL transmission is based on BS configuration and can be used in cases where reciprocity may not hold.

Figure 8:
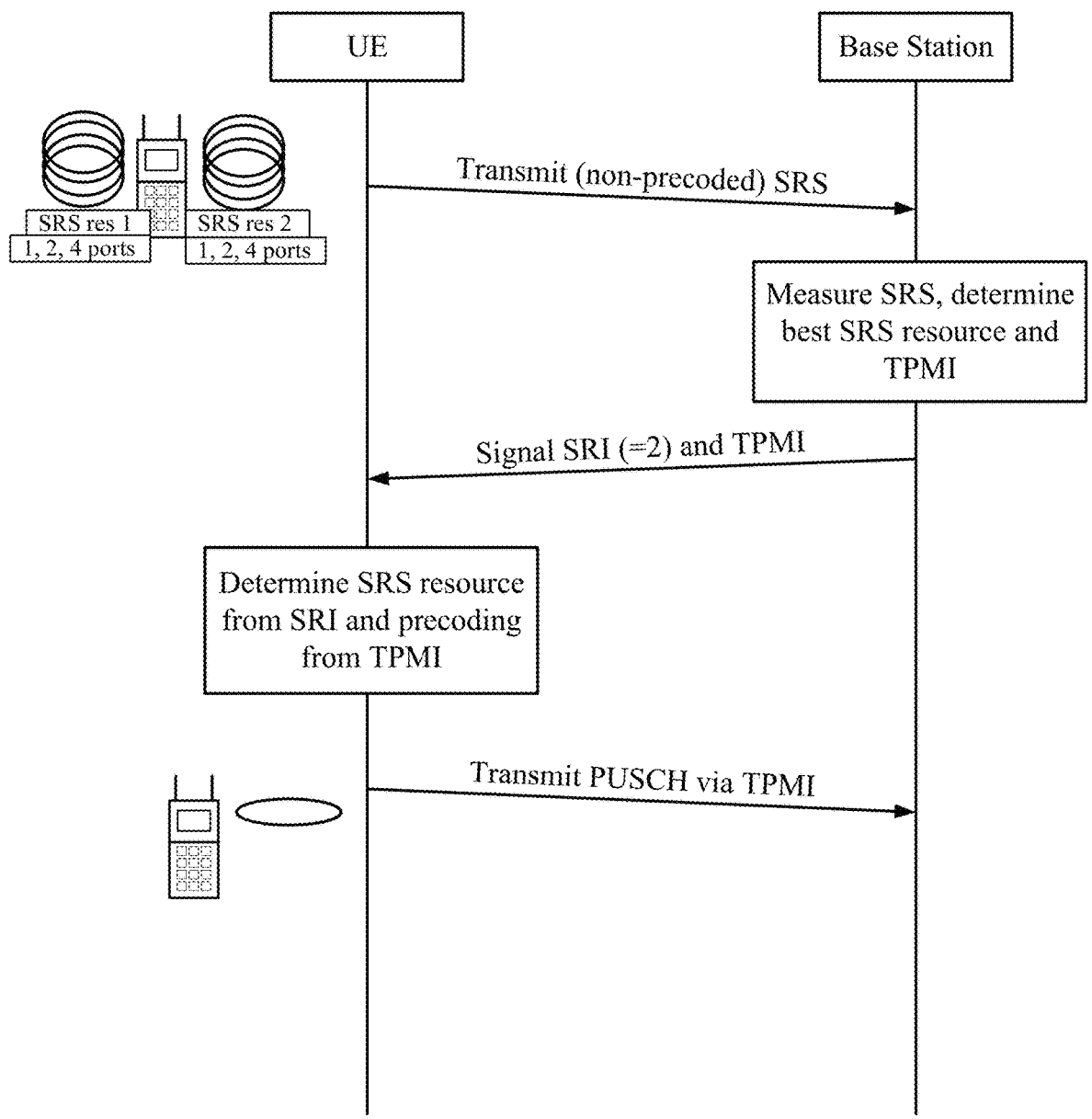
FIG. 8 is a call flow diagram illustrating an example of codebook based uplink (UL) transmission, in accordance with certain aspects of the present disclosure.

FIG. 8 is a call flow diagram 800 illustrating an example of conventional codebook based UL transmission using a wideband precoder. As illustrated, a UE transmits (non-precoded) SRS with up to 2 SRS resources (with each resource having 1, 2 or 4 ports). The gNB measures the SRS and, based on the measurement, selects one SRS resource and a wideband precoder to be applied to the SRS ports within the selected resource.

As illustrated, the gNB configures the UE with the selected SRS resource via an SRS resource indictor (SRI) and with the wideband precoder via a transmit precoder matrix indicator (TPMI). For a dynamic grant, the SRI and TPMI may be configured via DCI format 0_1. For a configured grant (e.g., for semi-persistent uplink), SRI and TPMI may be configured via RRC or DCI.

The UE determines the selected SRS resource from the SRI and precoding from TPMI and transmits PUSCH accordingly.

Figure 9:
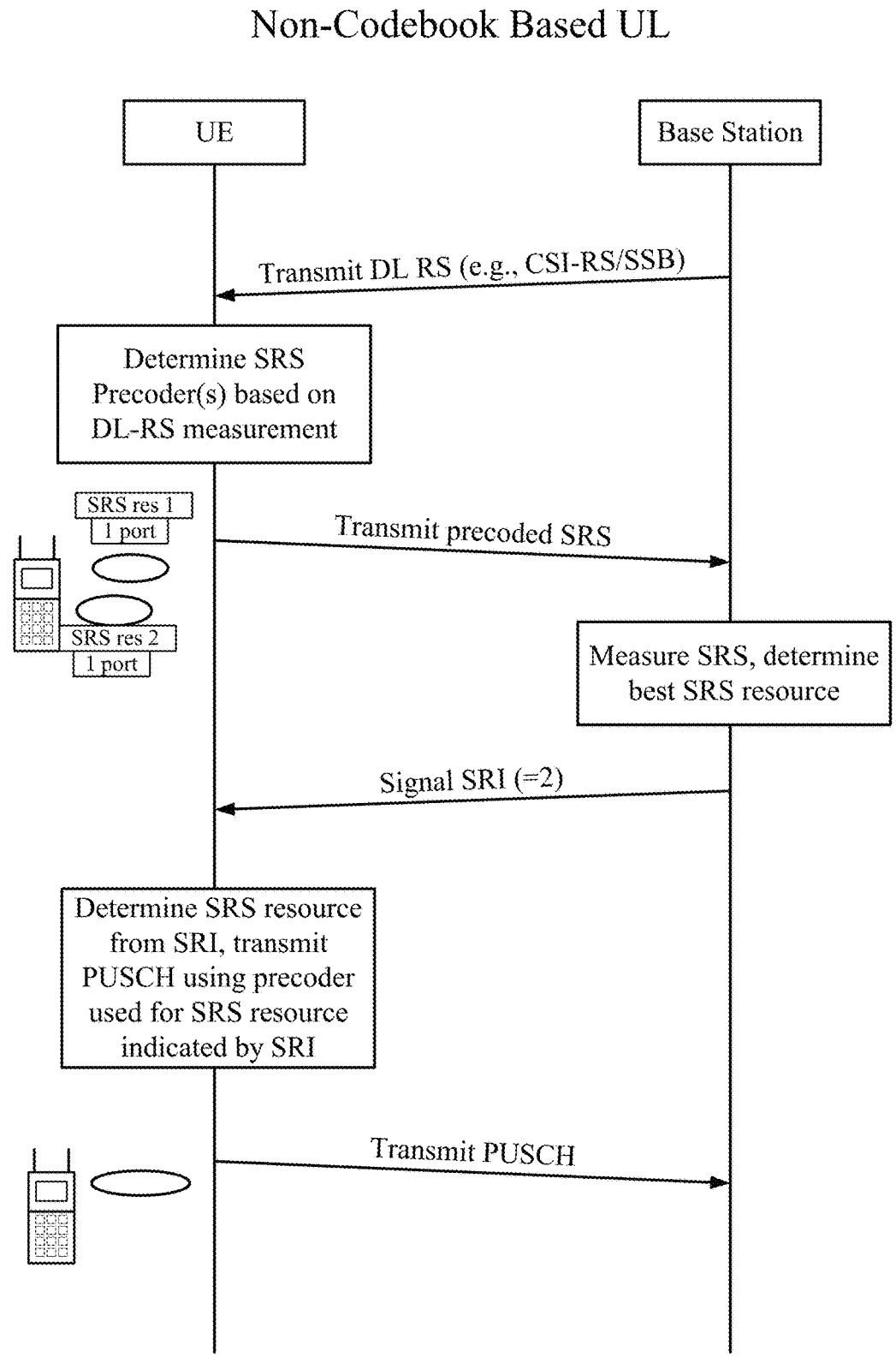
FIG. 9 is a call flow diagram illustrating an example of non-codebook based UL transmission, in accordance with certain aspects of the present disclosure.

FIG. 9 is a call flow diagram 900 illustrating an example of non-codebook based UL transmission. As illustrated, a UE transmits (precoded) SRS. While the example shows 2 SRS resources, the UE may transmit with up to 4 SRS resources (with each resource having 1 port). The gNB measures the SRS and, based on the measurement, selects one or more SRS resource. In this case, since the UE sent the SRS precoded, by selecting the SRS resource, the gNB is effectively also selecting precoding. For non-codebook based UL transmission, each SRS resource corresponds to a layer. The precoder of the layer is actually the precoder of the SRS which is emulated by the UE. Selecting N SRS resources means the rank is N. The UE is to transmit PUSCH using the same precoder as the SRS.

As illustrated, the gNB configures the UE with the selected SRS resource via an SRS resource indictor (SRI). For a dynamic grant, the SRI may be configured via DCI format 0_1. For a configured grant, the SRI may be configured via RRC or DCI.

Aspects Related to Precoded Reference Signals for CLI Feedback Reporting

Aspects of the present disclosure provide techniques that may help detect potential sources of interference, such as inter-UE CLI described above. In some cases, an aggressor UE may be configured to transmit precoded CLI-RS, essentially mimicking a future PUSCH transmission. A victim UE may be configured to perform CLI measurements based on the transmitted precoded CLI-RS.

Figure 10:
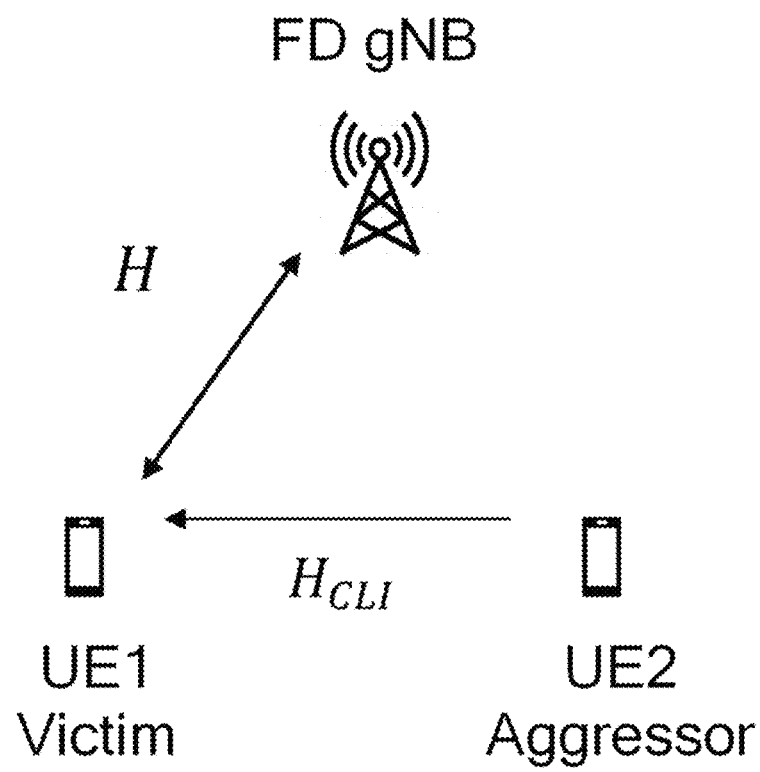
FIG. 10 depicts example signal reception by a victim UE.

As illustrated in FIG. 10, the receive (Rx) signal at the victim UE (UE1) may be expressed as:

$$y = HPx + H_{CLI} Tz + n;$$

where $H_{CLI} Tz$ is the effective CLI channel (based on the CLI channel and UL precoder at the aggressor).

The techniques proposed herein may enable improved channel state feedback (CSF) computation at the victim UE, allowing a gNB to receive accurate CSF reporting, capturing the impact of inter-UE CLI in FD slots.

In some scenarios, unprecoded CLI channel estimation may be utilized. In such cases, unprecoded CLI-RS may be used for estimating CLI channel and TPMI precoding may be indicated in a CSF configuration. In some cases, whether CSF is based on precoded CLI-RS or unprecoded CLI-RS may depend on channel conditions. For example, if a channel is associated with fast-varying CLI, CSF based on precoded CLI-RS may be beneficial.

Figure 11:
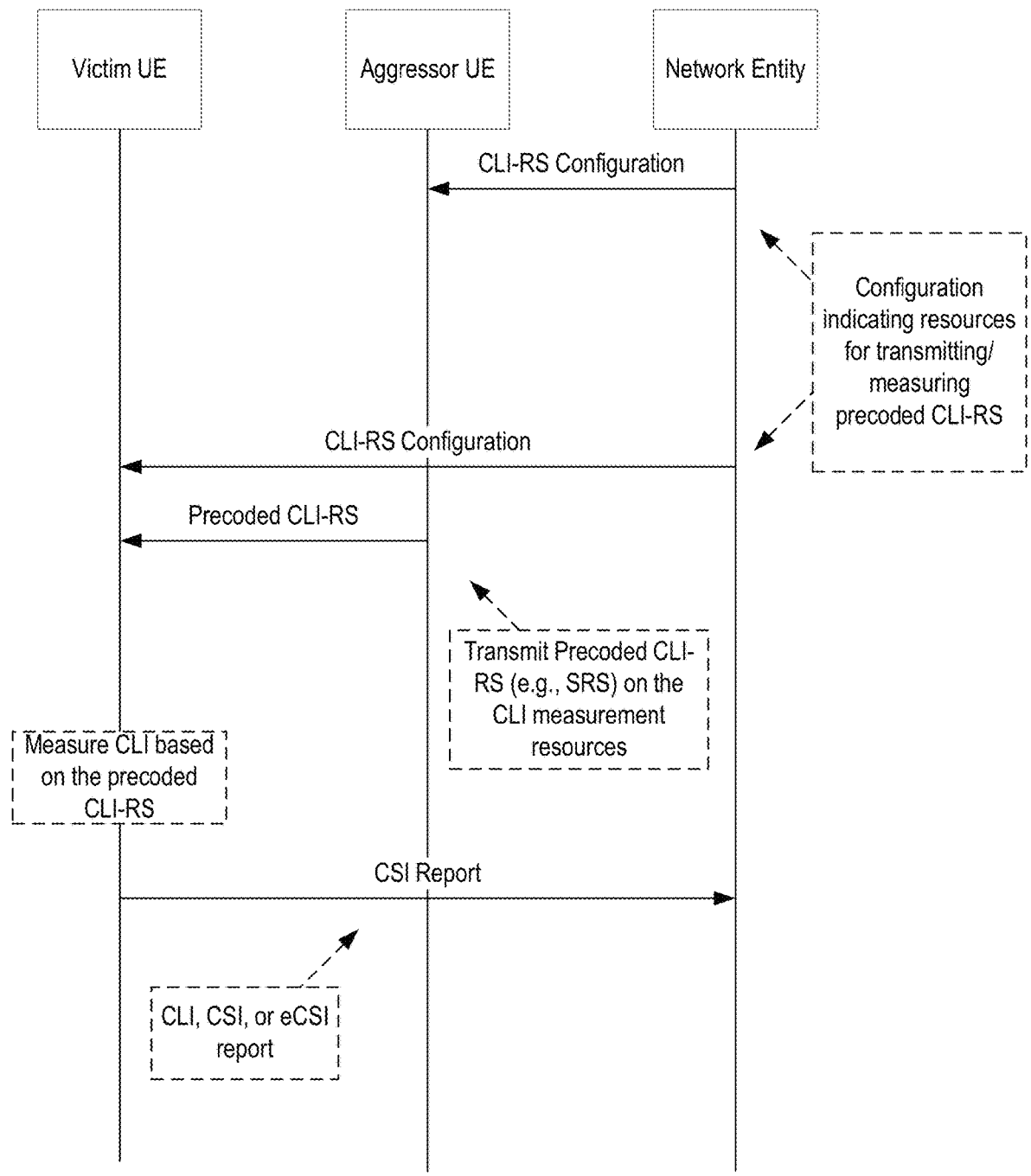
FIG. 11 depicts a call flow diagram in accordance with certain aspects of the present disclosure.

The concept of CSF based on precoded CLI-RS may be understood with reference to the call flow diagram 1100 of FIG. 11.

As illustrated, an aggressor UE may receive, from a network entity (e.g., a gNB or node of a disaggregated base station), configuration information configuring the aggressor UE with at least one resource for transmitting precoded RS (CLI-RS) for CLI measurement by a victim UE. Similarly, the victim UE may receive configuration information configuring the victim UE with the same resource for measuring CLI.

The aggressor UE may then transmit the precoded RS (e.g., SRS) on the resource. The victim UE may measure CLI based on the precoded CLI-RS, generate, and transmit a CSI report based on the measurement.

Figure 12:
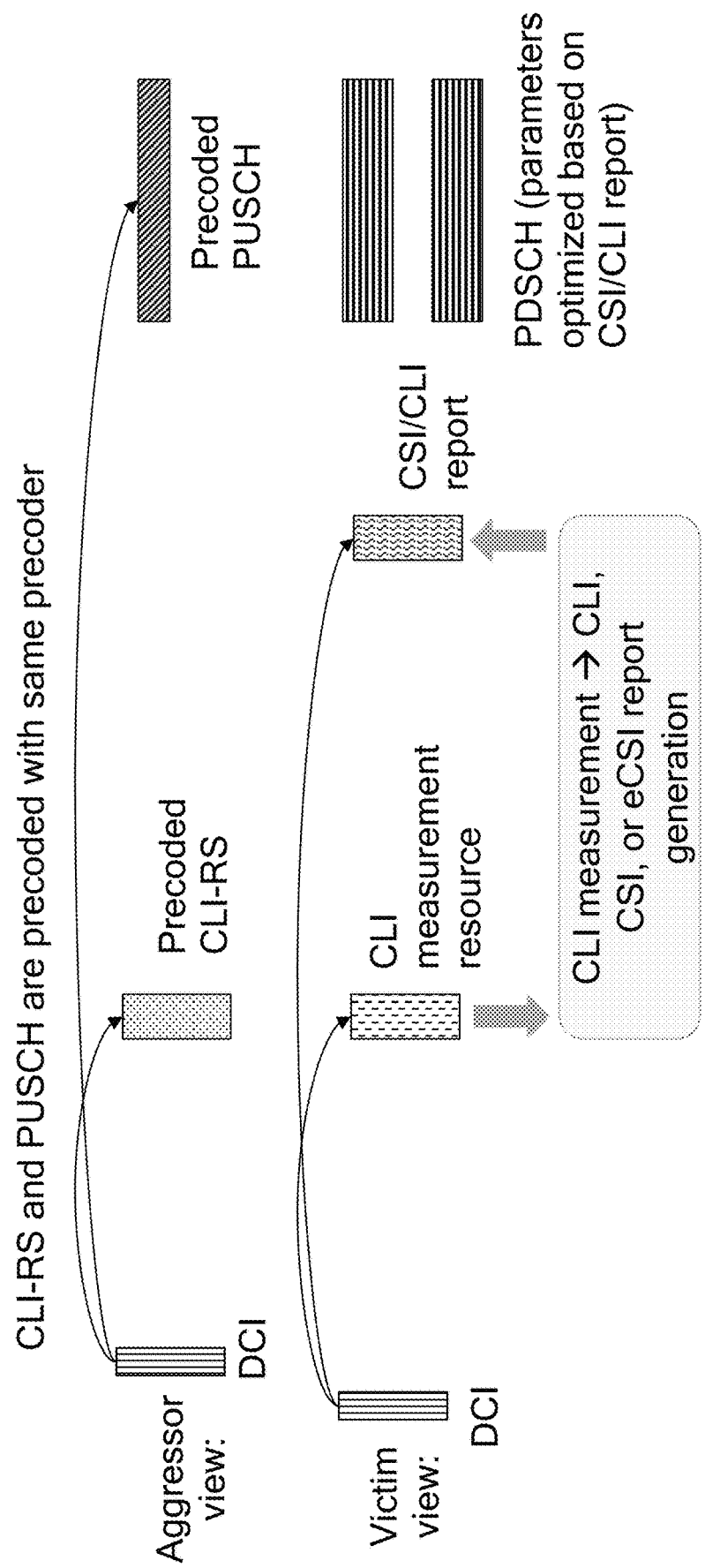
FIG. 12 depicts a procedure for enabling CLI-aware CSI reporting in full duplex (FD) scenarios.

FIG. 12 is a timing diagram that illustrates the overall procedure for CLI-aware CSI reporting in FD, based on precoded CLI-RS, from the perspective of the aggressor UE and victim UE. While the example shows PUSCH scheduled by dynamic grants, based on DCI, the same process can also be extended to configured grant (CG) based PUSCH and semi-persistent (SP) CLI-RS.

As illustrated, the victim UE may measure CLI, based on precoded CLI-RS (transmitted by the aggressor UE) and generate a CSI/CLI report. Based on the CSI/CLI report, a gNB operating in FD mode may receive precoded PUSCH from the aggressor UE, while transmitting PDSCH to the victim UE, with parameters optimized based on CSI/CLI report.

In some cases, the gNB may configure the aggressor UE with a RS for sounding the precoded inter-UE CLI channel (or for Rnn measurement at the victim). To better mimic CLI (at the victim UE) that may occur during an upcoming PUSCH transmission by the aggressor UE, the CLI-RS may be precoded with same precoder selected for the upcoming PUSCH transmission.

According to a first option, the gNB may configure the aggressor with multi-port CLI-SRS, which is precoded with same precoder as PUSCH. In such cases, CLI-sounding reference signals (CLI-SRS) may be used for explicit or implicit CLI channel measurement. The power control of CLI-SRS may be configured to follow the same power control of PUSCH.

According to a second option, CSI-RS-like multi-port RS may be precoded with same precoder as PUSCH. In this case, the RS may have the same number of ports of upcoming PUSCH. For this approach, the UE may need to be able to support generation and transmission of CSI-RS like RS, which may not be desirable.

According to a second option, precoded PUSCH demodulation reference signals (DMRS) may be used for sounding the CLI channel. In some cases, the PUSCH allocation may be dynamic and position of DMRS symbols may change and the victim UE may not know the scramblingID used in DMRS-sequence generation. Because of this, the gNB may configure the victim UE with AP multi-port CLI measurement resource that matches the DMRS configuration. For repetition, multiple precoders may be supported. In some cases, there may be no filtering with other grants (e.g., filtering may be limited to be within repetitions).

In some cases, a new RS signal may be defined, which may be embedded in PUSCH. To distinguish from DMRS, this new RS may have a scrambling-ID different from DMRS.

In some cases (e.g., for Codebook-based UL), a gNB may indicate to the aggressor UE to precode CLI-SRS with the same precoder used for the upcoming PUSCH. According to one option, a pairing of CLI-RS and DG/CG PUSCH may be decided, after the gNB has decided SRI/TPMI. For DG based UL DCI, each grant may indicate a TPMI precoder to be used. The DG UL DCI may trigger both aperiodic the aperiodic (AP) multi-port CLI-SRS and PUSCH. The precoder indicated by the DCI may be used for both PUSCH and CLI-SRS. In this manner, AP CLI-SRS and PUSCH are linked (paired) by the triggering DCI. In some cases, AP CLI-SRS may be configured to have the same number of ports as DG-PUSCH. This approach may also be applied to CG-PUSCH (type-2), where SP CLI-SRS and CG-PUSCH type-2 transmission may be similarly linked via the activation DCI.

For CG-PUSCH type-1, persistent CLI-SRS may be configured and indicated via radio resource control (RRC) configuration. In such cases, a same precoding and number of layers and same SRI field may be used. This approach may also be applied to type 2 CG-PUSCH as a default, if there is no indication of such parameters in DCI.

In codebook-based UL, the gNB decides SRI based on one or more SRS resources (with parameter usage=codebook). This allows for UL beam sweeping, which is in particularly useful for FR2. As noted above, a gNB may already have decided on SRI/TPMI or CLI-SRS may be transmitted before SRI/TPMI is selected.

In some cases, the aggressor UE may be configured with multiple CLI-SRS resources. In such case, each CLI-SRS may be associated with an SRS (linked by SRI). The aggressor UE may transmit multiple CLI-SRS, in which case the victim UE may have multiple CLI hypothesis (to use for reporting). For example, assuming a resource set which contains two SRS resources (two CLI-SRS resources), the aggressor UE may need to decide on a TPMI to be used for precoding CLI-SRS. In one case, a UE may be configured with predefined rules for figuring out TPMI used for CLI-SRS (e.g., based on a latest configured PUSCH TPMI used (assuming TPMI is fixed for multiple PUSCH transmissions). This may be used for CLI/CSI reporting.

In some cases, no precoding may be considered (e.g., a TPMI of identity). In this case, only an analog beam may be associated with SRI. This approach may be useful for an enhanced CSF (eCSF) framework where TPMI may be signaled to victim UE as part of eCSI report configuration.

Figure 13:
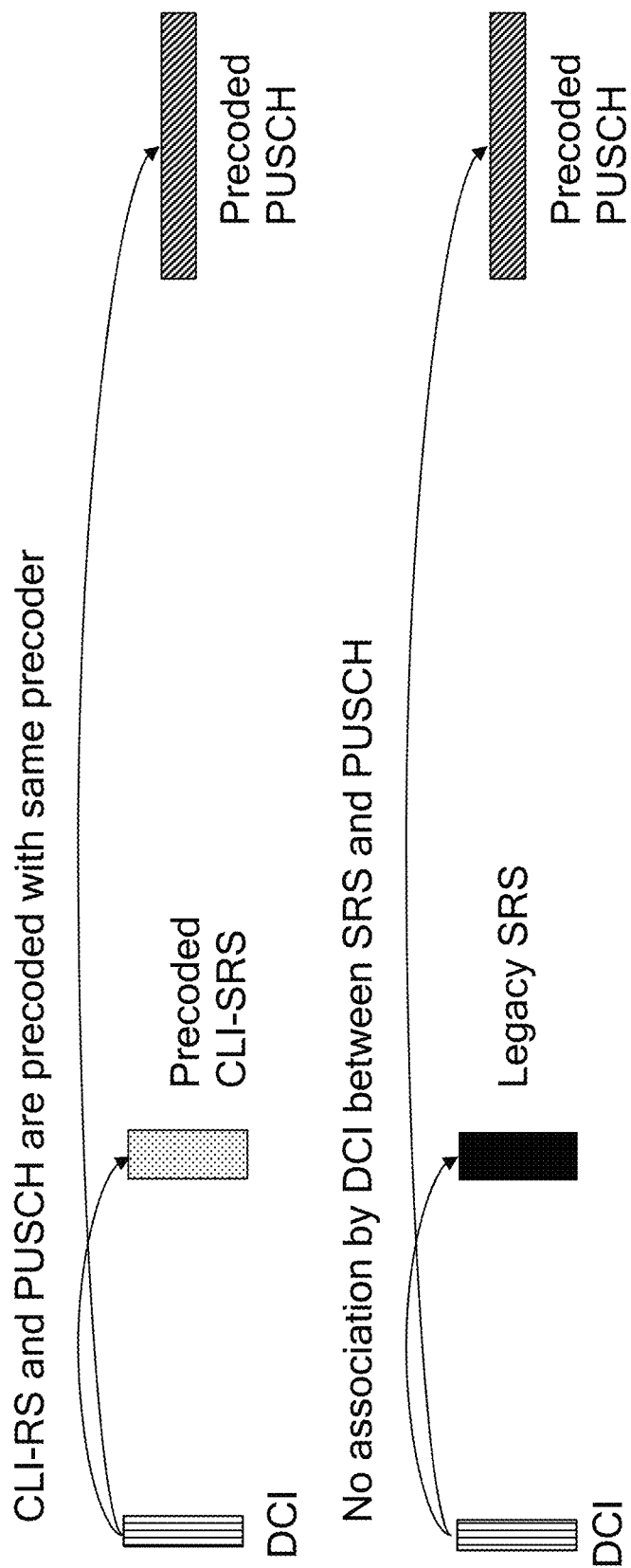
FIG. 13 depicts diagrams illustrating differences between CLI-SRS and legacy SRS.

In some cases, there may be a mechanism to differentiate CLI-SRS from regular (legacy) SRS used for uplink channel estimation, as legacy SRS is not to be precoded with TPMI. In some cases, CLI-SRS may be differentiated from legacy SRS by RRC configuration. For example, in the configuration CLI-SRS may be an SRS configuration with a new usage value (e.g., usage=CLI). As illustrated in FIG. 13, in this case, the association between PUSCH and SRS may only apply to CLI-SRS (e.g. and there may be no association by DCI between legacy SRS and PUSCH).

In some cases (e.g., for non-codebook based UL transmissions), the gNB may indicate, to the aggressor UE, an association between CLI-SRS and precoder used for an upcoming PUSCH. For non-codebook-based UL, there is typically no TPMI and precoding is transparent. In such cases, the aggressor UE may derive the precoder based on downlink (DL) CSI-RS (e.g., as a spatial relationship between CSI-RS and SRS is indicated).

According to one option, CLI-RS and DG/CG PUSCH paring may happen after the gNB has decided on SRI. In such cases, DG UL DCI may indicate an SRI and trigger an AP multi-port CLI-SRS transmission. The same SRI may be used for the PUSCH and CLI-SRS, to indicate the precoder to be used and the number of layers. The CLI-SRS number of ports may match upcoming PUSCH number of layers.

For CG-PUSCH type-2, a same approach may be applied, where SP CLI-SRS and CG-PUSCH type-2 transmission are linked via the activation DCI. For CG-PUSCH type-1, however, periodic P CLI-SRS may be configured and indicated in an RRC configuration. In this case, a same SRI field may be used (this may also be applied to CG-PUSCH type-2 as a default if there is no indication in DCI).

According to another option, the gNB may not have decided on SRI before CLI-SRS transmission. In some cases, the aggressor UE may be configured with multiple multi-port CLI-SRS resources and each CLI-SRS may be associated with an SRI choice. In this case, the aggressor UE transmits multiple CLI-SRS and the victim will have multiple CLI hypothesis for reporting. In other cases, there may be no need for dedicated CLI-SRS. In such cases, the same SRS resources (e.g., with usage=nonCodebook) may be used for both UL channel and CLI measurement. In such cases, the victim UE may measure multiple single-port zero power SRS (ZP-SRS. This approach may be useful for extending eCSF framework to nonCodebook UL, where an eCSF report indicates to the victim UE which interference hypothesis to use.

According to certain aspects, the gNB may configure the victim UE with one or more multi-port ZP-SRS for measurement of the precoded CLI channel. According to one option, to enable CLI-aware CSF, each ZP-SRS may be be used to derive a CLI hypothesis which, in turn, may be be used in determining the preferred CSF parameters. In this case, a CLI hypothesis can be a covariance matrix of the precoded CLI channel ($\tilde{H}_{CLI}\tilde{H}_{CLI}^*$) or a combined Rnn measurement for one or more CLI sources and other residual interference plus noise. According to another option, the victim UE may report explicit CLI measurement to the gNB. For example, the victim UE may report covariance of CLI channel or Rnn feedback.

As noted above, in some cases, CLI-SRS may be transmitted before TPMI is decided. In such cases, if eCSF is configured for codebook-based UL, TPMI may not be known when CLI-SRS is transmitted. According to one option, no precoding may be applied on the CLI-SRS (TPMI is identity) and only an analog beam may be associated with SRI. The victim UE may be configured for eCSF reporting and one or more TPMIs may be indicated in the eCSF report configuration.

In some cases, SRI (Non-codebook UL) may not be known when CLI-SRS is transmitted. In such cases, the same SRS resources (with usage=nonCodebook) may be used for both UL channel estimation and CLI channel sounding. The victim UE may be configured with multiple single-port ZP-SRS and configured for eCSF reporting to indicate a CLI hypothesis. The CLI hypothesis may be an SRI value in case of NonCodebook UL (the SRI value may indicate UL rank and layer indices). In such cases, the eCSF report configuration may include one or more CLI hypotheses.

In some cases, CLI spatial response may be dependent on the choice of TPMI and rank at the aggressor. In turn, optimal CSF selection (e.g., PMI, RI, CQI) may be different for different TPMI/rank hypothesis at the aggressor. Single-layer CLI and multi-layer CLI may also differ, as multi-layer interference may cover a wider angle and be harder to avoid in the angular space. Single-layer interference may lead to non-uniform CLI in the angular space. In some cases, the performance may depend on the precoded CLI channel, the orientation of the victim UE and aggressor UE, and the TPMI choice at the aggressor UE.

Example Operations of a User Equipment

Figure 14:
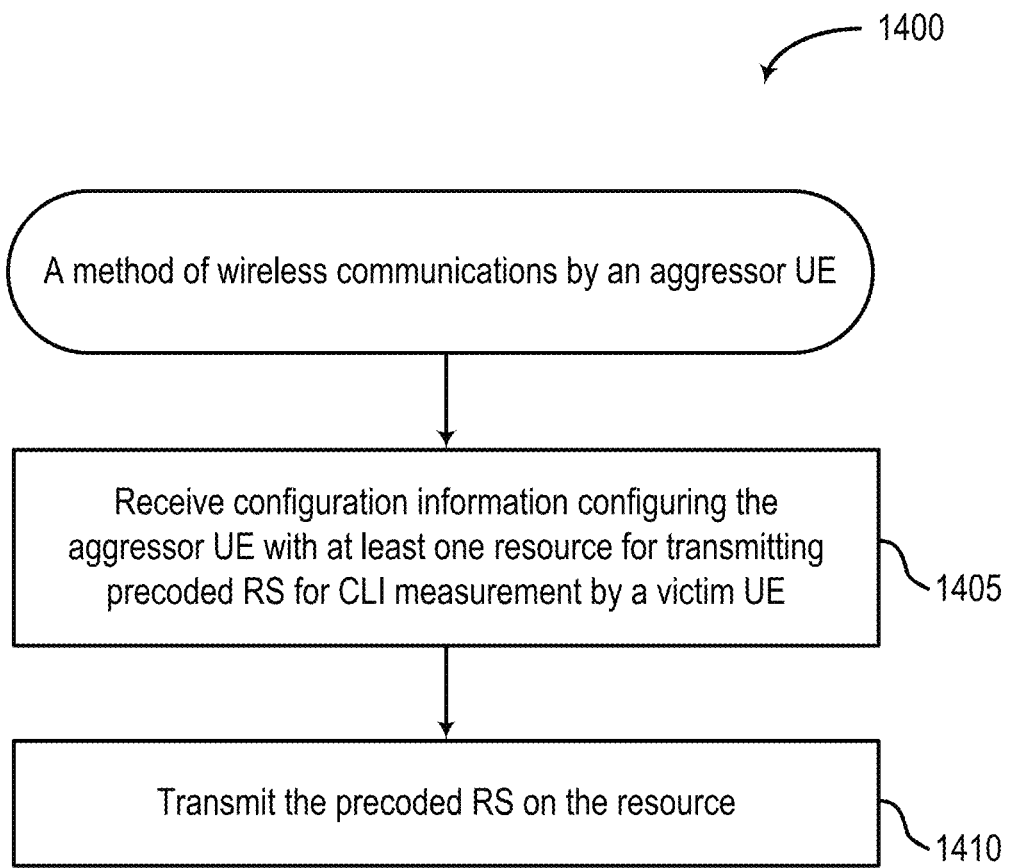
FIG. 14 depicts a method for wireless communications.

FIG. 14 shows an example of a method 1400 for wireless communications by an aggressor UE, such as by a UE 104 of FIGS. 1 and 3.

Method 1400 begins at step 1405 with receiving configuration information configuring the aggressor UE with at least one resource for transmitting precoded RS for CLI measurement by a victim UE. In some cases, the operations of this step refer to, or may be performed by, circuitry for receiving and/or code for receiving as described with reference to FIG. 17.

Method 1400 then proceeds to step 1410 with transmitting the precoded RS on the resource. In some cases, the operations of this step refer to, or may be performed by, circuitry for transmitting and/or code for transmitting as described with reference to FIG. 17.

In some aspects, the method 1400 further includes transmitting a PUSCH using a same precoder as used when transmitting the precoded RS. In some cases, the operations of this step refer to, or may be performed by, circuitry for transmitting and/or code for transmitting as described with reference to FIG. 17.

In some aspects, the configuration information configures the UE for transmitting multi-port CLI-SRS using the same precoder as PUSCH.

In some aspects, the UE transmits the multi-port CLI-SRS with power control, based on power control of the PUSCH.

In some aspects, the configuration information configures the UE for transmitting multi-port RS using the same precoder as PUSCH; and the RS is transmitted using a same number of ports as the PUSCH.

In some aspects, the RS comprises PUSCH DMRSs with dynamic symbol positions.

In some aspects, the RS is embedded in the PUSCH; and the RS embedded in the PUSCH is scrambled with a different scrambling ID than used for scrambling DMRSs.

In some aspects, the method 1400 further includes receiving an indication, from a network entity, indicating that the aggressor UE is to precode the RS with a same precoder as the precoder used to transmit PUSCH. In some cases, the operations of this step refer to, or may be performed by, circuitry for receiving and/or code for receiving as described with reference to FIG. 17.

In some aspects, the indication is transmitted as DCI.

In some aspects, the DCI indicates a TPMI for precoding the RSs and the PUSCH.

In some aspects, the aggressor UE is configured with rules for determining a TPMI to use for precoding RS on each of the multiple resources.

In some aspects, the indication is provided via RRC configuration.

In some aspects, the configuration information configures the aggressor UE with multiple resources, each associated with a RS transmitted for CLI measurement by the victim UE.

In some aspects, the rules allow a TPMI that is identity.

In some aspects, the method 1400 further includes receiving an indication of an association between the precoded RS and a precoder for an upcoming PUSCH. In some cases, the operations of this step refer to, or may be performed by, circuitry for receiving and/or code for receiving as described with reference to FIG. 17.

In some aspects, the association is provided via a SRI indicated via DCI.

In some aspects, RRC configuration indicates that the association is provided via SRI.

In some aspects, a default association is assumed if a DCI does not indicate an SRI.

In some aspects, the aggressor is configured with multiple resources for transmitting precoded RS for CLI measurement by the victim UE; and each of the multiple resources is associated with a SRI.

In some aspects, the precoded RS comprises SRS; and configuration information indicates a usage type of the SRS is for CLI measurement.

In some aspects, the resource is also used to transmit SRS for uplink channel measurement.

Figure 17:
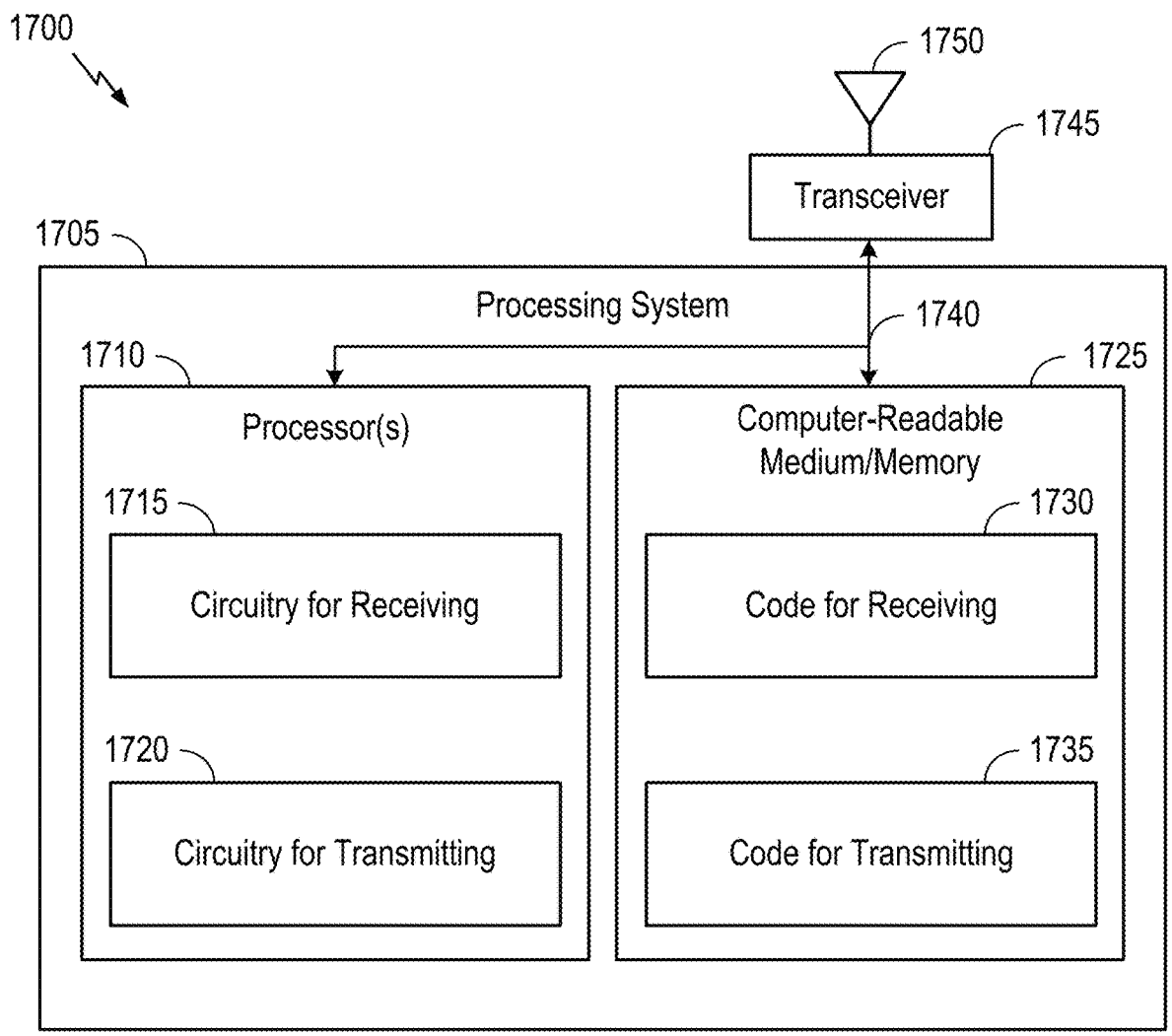
FIG. 17 depicts aspects of an example communications device.

In one aspect, method 1400, or any aspect related to it, may be performed by an apparatus, such as communications device 1700 of FIG. 17, which includes various components operable, configured, or adapted to perform the method 1400. Communications device 1700 is described below in further detail.

Note that FIG. 14 is just one example of a method, and other methods including fewer, additional, or alternative steps are possible consistent with this disclosure.

Figure 15:
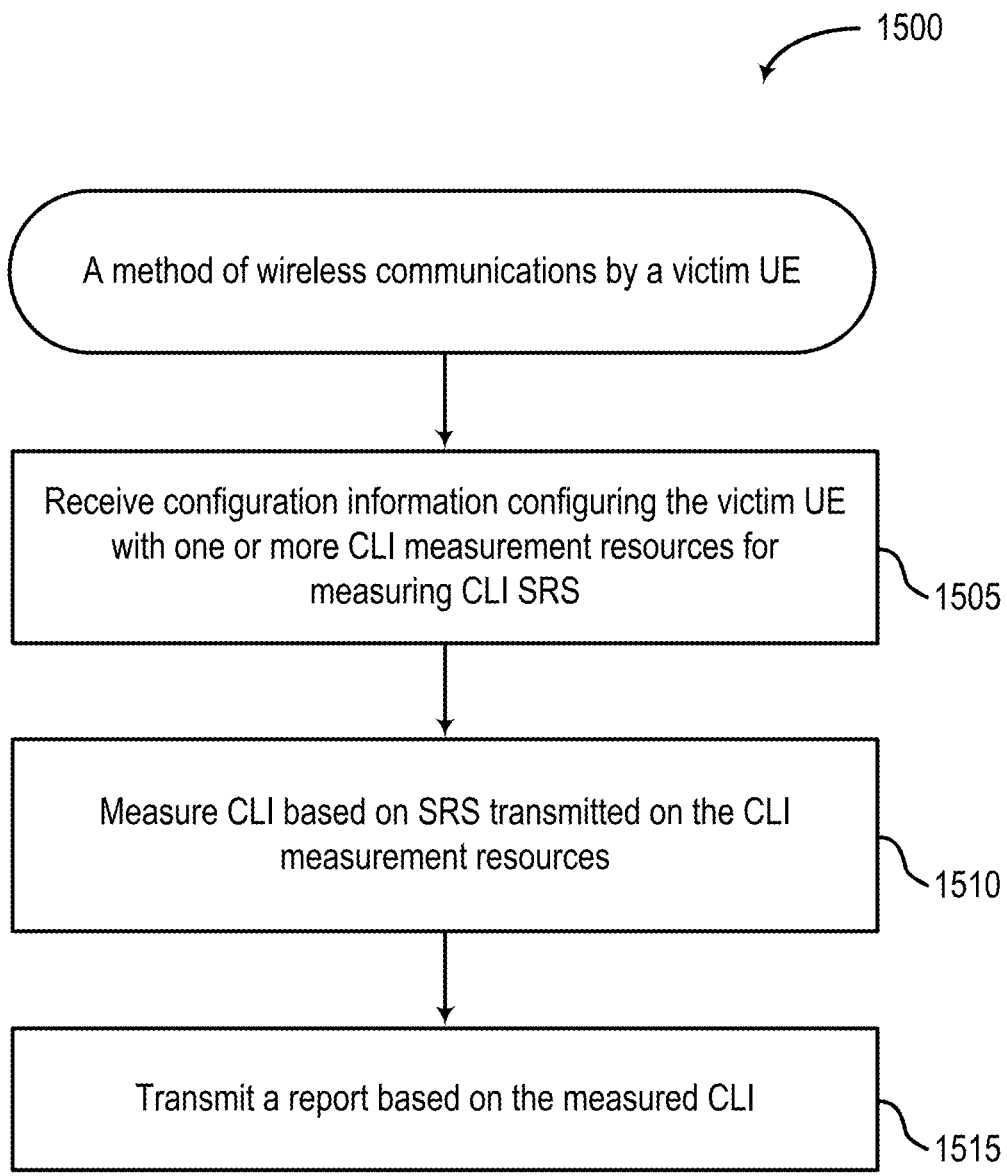
FIG. 15 depicts a method for wireless communications.

FIG. 15 shows an example of a method 1500 for wireless communications by a victim UE, such as by a UE 104 of FIGS. 1 and 3.

Method 1500 begins at step 1505 with receiving configuration information configuring the victim UE with one or more CLI measurement resources for measuring CLI SRS. In some cases, the operations of this step refer to, or may be performed by, circuitry for receiving and/or code for receiving as described with reference to FIG. 18.

Method 1500 then proceeds to step 1510 with measuring CLI based on SRS transmitted on the CLI measurement resources. In some cases, the operations of this step refer to, or may be performed by, circuitry for measuring and/or code for measuring as described with reference to FIG. 18.

Method 1500 then proceeds to step 1515 with transmitting a report based on the measured CLI. In some cases, the operations of this step refer to, or may be performed by, circuitry for transmitting and/or code for transmitting as described with reference to FIG. 18.

In some aspects, the configuration information configures the victim UE with one or more multi-port ZP-SRS resources for measurement of precoded CLI SRS.

In some aspects, the method 1500 further includes deriving a CLI hypothesis based on measurements taken on each ZP-SRS resource. In some cases, the operations of this step refer to, or may be performed by, circuitry for deriving and/or code for deriving as described with reference to FIG. 18.

In some aspects, the report includes explicit CLI measurements taken on the ZP-SRS resources.

In some aspects, the configuration information indicates one or more TPMIs.

In some aspects, the configuration information configures the victim UE with multiple single port ZP-SRS resources for measurement of precoded CLI SRS; and the report indicates a CLI hypothesis based on measurements taken on the multiple single port ZP-SRS resources.

Figure 18:
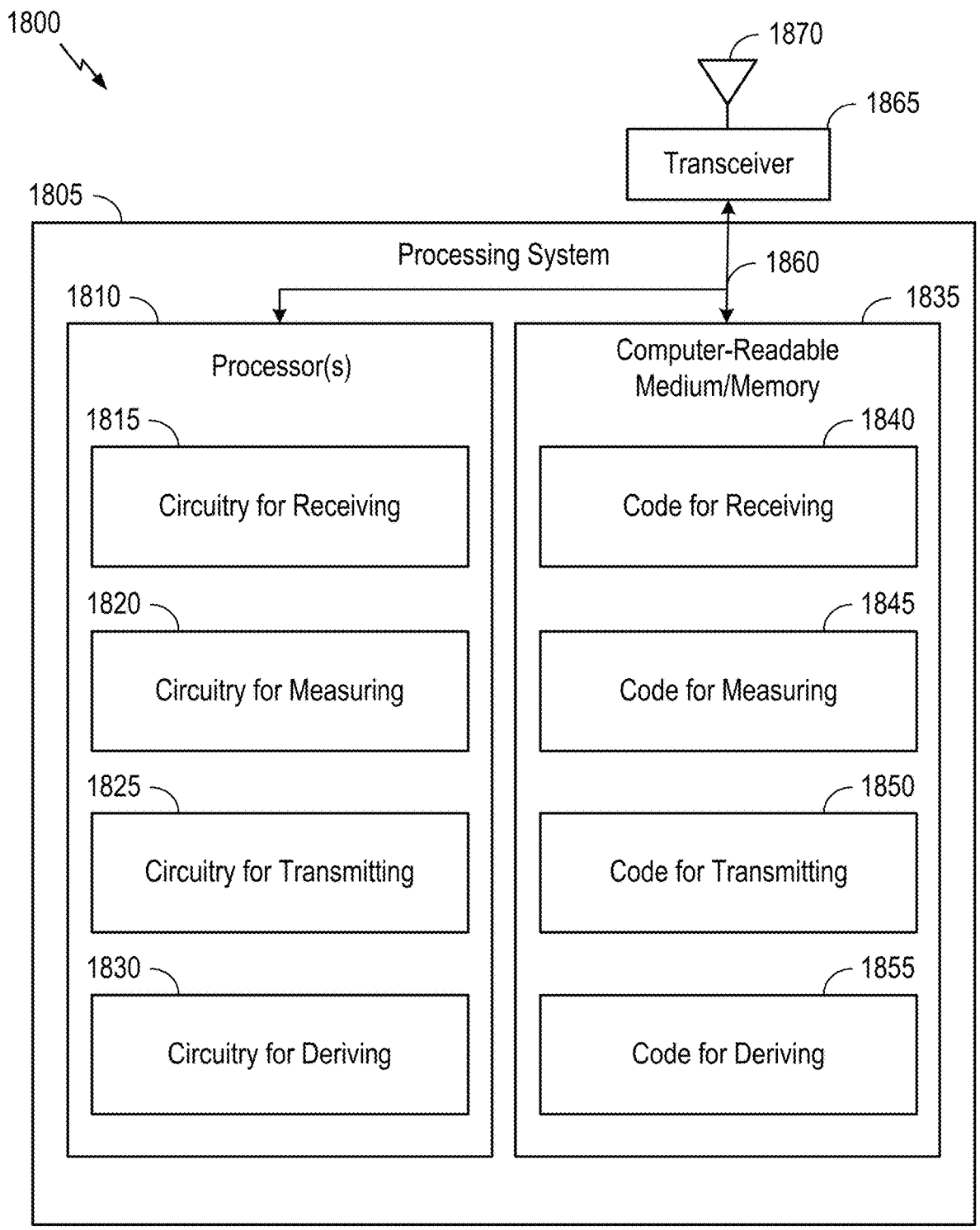
FIG. 18 depicts aspects of an example communications device.

In one aspect, method 1500, or any aspect related to it, may be performed by an apparatus, such as communications device 1800 of FIG. 18, which includes various components operable, configured, or adapted to perform the method 1500. Communications device 1800 is described below in further detail.

Note that FIG. 15 is just one example of a method, and other methods including fewer, additional, or alternative steps are possible consistent with this disclosure.

Example Operations of a Network Entity

Figure 16:
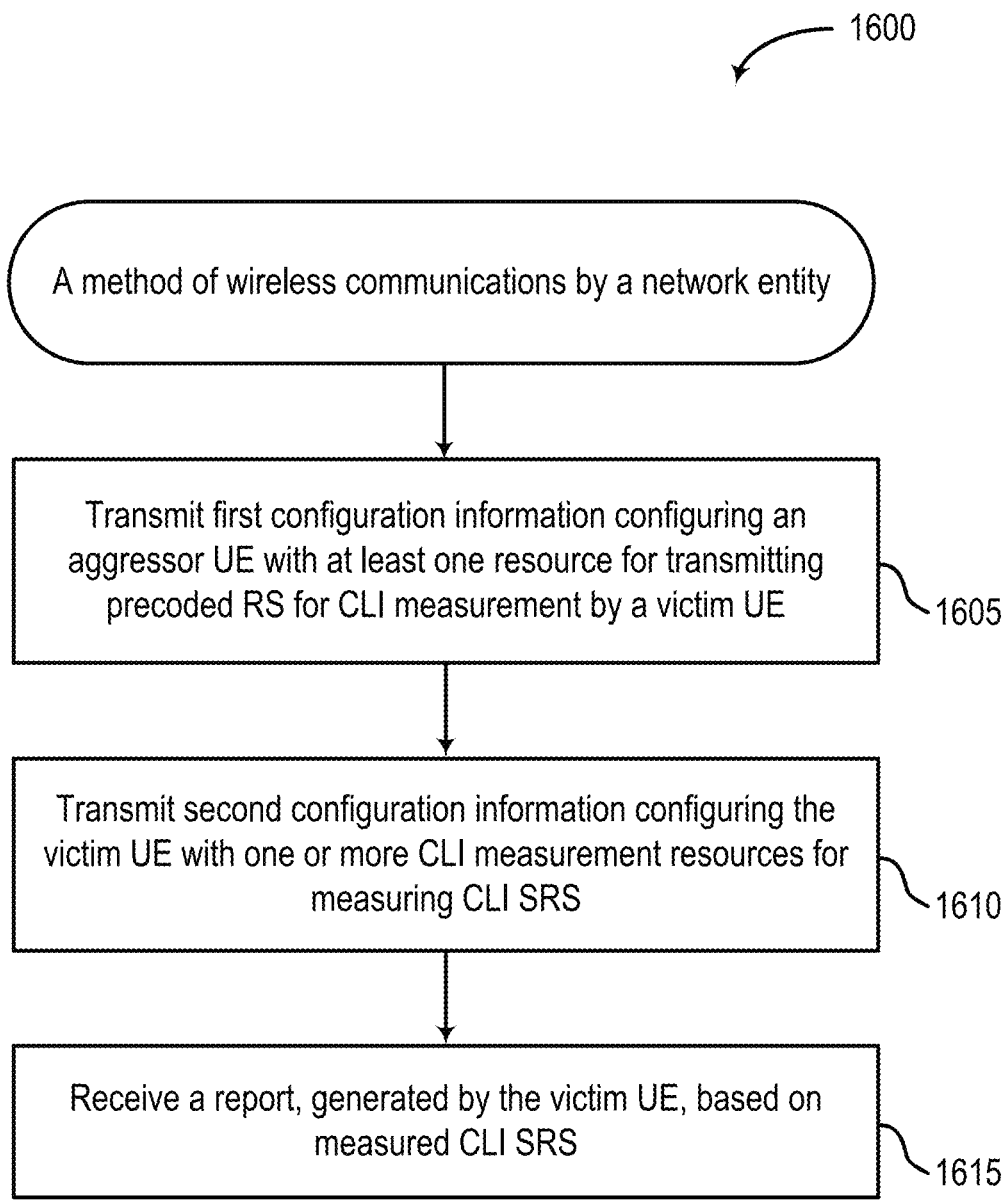
FIG. 16 depicts a method for wireless communications.

FIG. 16 shows an example of a method 1600 for wireless communications by a network entity, such as BS 102 of FIGS. 1 and 3, or a disaggregated base station as discussed with respect to FIG. 2.

Method 1600 begins at step 1605 with transmitting first configuration information configuring an aggressor UE with at least one resource for transmitting precoded RS for CLI measurement by a victim UE. In some cases, the operations of this step refer to, or may be performed by, circuitry for transmitting and/or code for transmitting as described with reference to FIG. 19.

Method 1600 then proceeds to step 1610 with transmitting second configuration information configuring the victim UE with one or more CLI measurement resources for measuring CLI SRS. In some cases, the operations of this step refer to, or may be performed by, circuitry for transmitting and/or code for transmitting as described with reference to FIG. 19.

Method 1600 then proceeds to step 1615 with receiving a report, generated by the victim UE, based on measured CLI SRS. In some cases, the operations of this step refer to, or may be performed by, circuitry for receiving and/or code for receiving as described with reference to FIG. 19.

In some aspects, the method 1600 further includes receiving a PUSCH transmitted using a same precoder as used when transmitting the precoded RS. In some cases, the operations of this step refer to, or may be performed by, circuitry for receiving and/or code for receiving as described with reference to FIG. 19.

In some aspects, the configuration information configures the UE for transmitting multi-port CLI-SRS using the same precoder as PUSCH.

In some aspects, the configuration information configures the aggressor UE for transmitting multi-port RS using the same precoder as PUSCH.

In some aspects, the method 1600 further includes transmitting an indication that the aggressor UE is to precode the RS with a same precoder as the precoder used to transmit PUSCH. In some cases, the operations of this step refer to, or may be performed by, circuitry for transmitting and/or code for transmitting as described with reference to FIG. 19.

In some aspects, the indication is transmitted as DCI.

In some aspects, the DCI indicates a TPMI for precoding the RSs and the PUSCH.

In some aspects, the aggressor UE is configured with rules for determining a TPMI to use for precoding RS on each of the multiple resources.

In some aspects, the indication is provided via RRC configuration.

In some aspects, the configuration information configures the aggressor UE with multiple resources, each associated with a RS transmitted for CLI measurement by the victim UE.

In some aspects, the method 1600 further includes transmitting an indication of an association between the precoded RS and a precoder for an upcoming PUSCH. In some cases, the operations of this step refer to, or may be performed by, circuitry for transmitting and/or code for transmitting as described with reference to FIG. 19.

In some aspects, the association is provided via a SRI indicated via DCI.

In some aspects, RRC configuration indicates that the association is provided via SRI.

In some aspects, the aggressor is configured with multiple resources for transmitting precoded RS for CLI measurement by the victim UE; and each of the multiple resources is associated with a SRI.

In some aspects, the configuration information configures the victim UE with one or more multi-port ZP-SRS resources for measurement of precoded CLI SRS.

In some aspects, the report includes explicit CLI measurements taken on the ZP-SRS resources.

In some aspects, the configuration information indicates one or more TPMIs.

In some aspects, the configuration information configures the victim UE with multiple single port ZP-SRS resources for measurement of precoded CLI SRS; and the report indicates a CLI hypothesis based on measurements taken on the multiple single port ZP-SRS resources.

Figure 19:
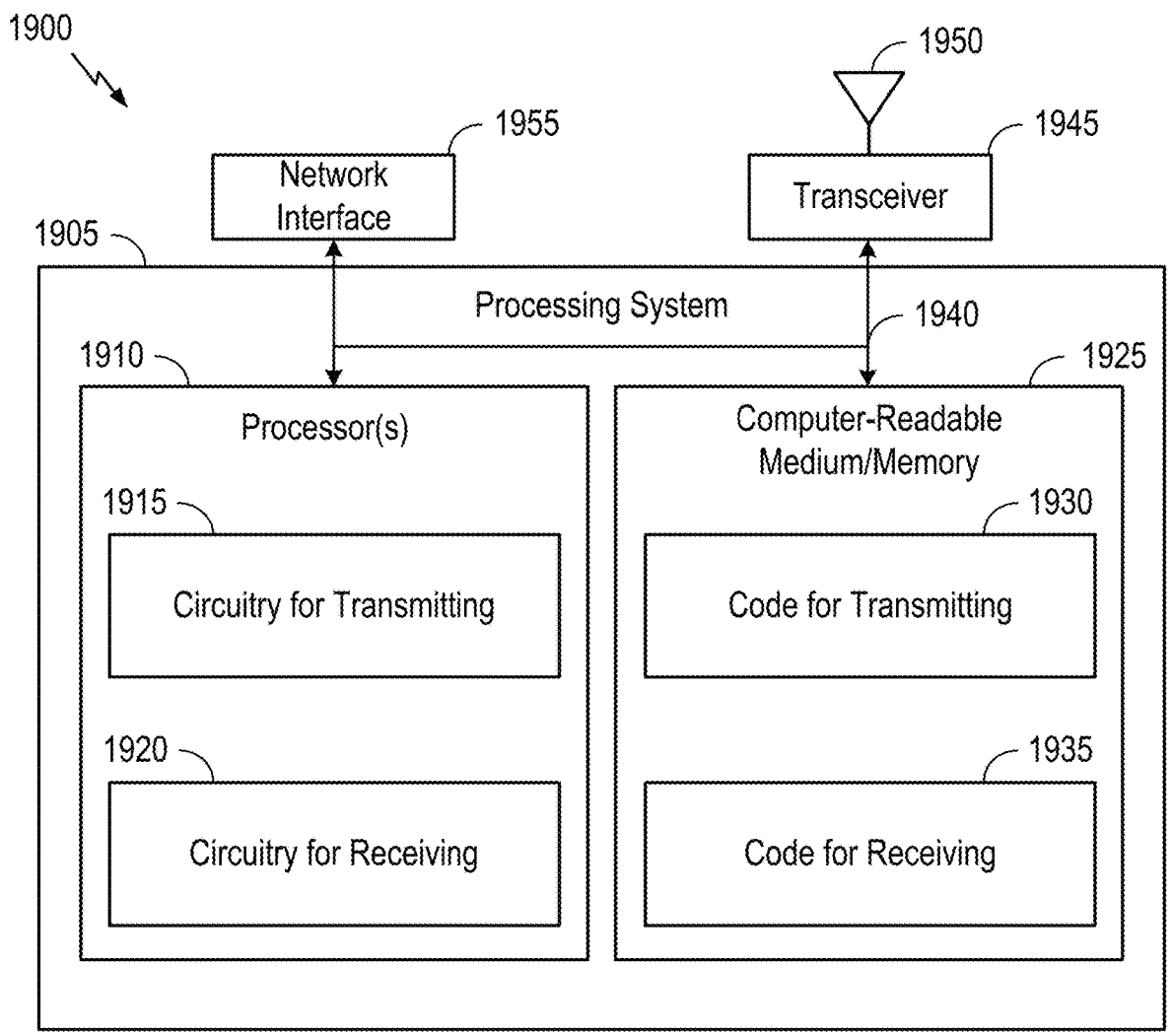
FIG. 19 depicts aspects of an example communications device.

In one aspect, method 1600, or any aspect related to it, may be performed by an apparatus, such as communications device 1900 of FIG. 19, which includes various components operable, configured, or adapted to perform the method 1600. Communications device 1900 is described below in further detail.

Note that FIG. 16 is just one example of a method, and other methods including fewer, additional, or alternative steps are possible consistent with this disclosure.

Example Communications Devices

FIG. 17 depicts aspects of an example communications device 1700. In some aspects, communications device 1700 is a user equipment, such as UE 104 described above with respect to FIGS. 1 and 3.

The communications device 1700 includes a processing system 1705 coupled to the transceiver 1745 (e.g., a transmitter and/or a receiver). The transceiver 1745 is configured to transmit and receive signals for the communications device 1700 via the antenna 1750, such as the various signals as described herein. The processing system 1705 may be configured to perform processing functions for the communications device 1700, including processing signals received and/or to be transmitted by the communications device 1700.

The processing system 1705 includes one or more processors 1710. In various aspects, the one or more processors 1710 may be representative of one or more of receive processor 358, transmit processor 364, TX MIMO processor 366, and/or controller/processor 380, as described with respect to FIG. 3. The one or more processors 1710 are coupled to a computer-readable medium/memory 1725 via a bus 1740. In certain aspects, the computer-readable medium/memory 1725 is configured to store instructions (e.g., computer-executable code) that when executed by the one or more processors 1710, cause the one or more processors 1710 to perform the method 1400 described with respect to FIG. 14, or any aspect related to it. Note that reference to a processor performing a function of communications device 1700 may include one or more processors 1710 performing that function of communications device 1700.

In the depicted example, computer-readable medium/memory 1725 stores code (e.g., executable instructions), such as code for receiving 1730 and code for transmitting 1735. Processing of the code for receiving 1730 and code for transmitting 1735 may cause the communications device 1700 to perform the method 1400 described with respect to FIG. 14, or any aspect related to it.

The one or more processors 1710 include circuitry configured to implement (e.g., execute) the code stored in the computer-readable medium/memory 1725, including circuitry such as circuitry for receiving 1715 and circuitry for transmitting 1720. Processing with circuitry for receiving 1715 and circuitry for transmitting 1720 may cause the communications device 1700 to perform the method 1400 described with respect to FIG. 14, or any aspect related to it.

Various components of the communications device 1700 may provide means for performing the method 1400 described with respect to FIG. 14, or any aspect related to it. For example, means for transmitting, sending or outputting for transmission may include transceivers 354 and/or antenna(s) 352 of the UE 104 illustrated in FIG. 3 and/or the transceiver 1745 and the antenna 1750 of the communications device 1700 in FIG. 17. Means for receiving or obtaining may include transceivers 354 and/or antenna(s) 352 of the UE 104 illustrated in FIG. 3 and/or the transceiver 1745 and the antenna 1750 of the communications device 1700 in FIG. 17.

FIG. 18 depicts aspects of an example communications device 1800. In some aspects, communications device 1800 is a user equipment, such as UE 104 described above with respect to FIGS. 1 and 3.

The communications device 1800 includes a processing system 1805 coupled to the transceiver 1865 (e.g., a transmitter and/or a receiver). The transceiver 1865 is configured to transmit and receive signals for the communications device 1800 via the antenna 1870, such as the various signals as described herein. The processing system 1805 may be configured to perform processing functions for the communications device 1800, including processing signals received and/or to be transmitted by the communications device 1800.

The processing system 1805 includes one or more processors 1810. In various aspects, the one or more processors 1810 may be representative of one or more of receive processor 358, transmit processor 364, TX MIMO processor 366, and/or controller/processor 380, as described with respect to FIG. 3. The one or more processors 1810 are coupled to a computer-readable medium/memory 1835 via a bus 1860. In certain aspects, the computer-readable medium/memory 1835 is configured to store instructions (e.g., computer-executable code) that when executed by the one or more processors 1810, cause the one or more processors 1810 to perform the method 1500 described with respect to FIG. 15, or any aspect related to it. Note that reference to a processor performing a function of communications device 1800 may include one or more processors 1810 performing that function of communications device 1800.

In the depicted example, computer-readable medium/memory 1835 stores code (e.g., executable instructions), such as code for receiving 1840, code for measuring 1845, code for transmitting 1850, and code for deriving 1855. Processing of the code for receiving 1840, code for measuring 1845, code for transmitting 1850, and code for deriving 1855 may cause the communications device 1800 to perform the method 1500 described with respect to FIG. 15, or any aspect related to it.

The one or more processors 1810 include circuitry configured to implement (e.g., execute) the code stored in the computer-readable medium/memory 1835, including circuitry such as circuitry for receiving 1815, circuitry for measuring 1820, circuitry for transmitting 1825, and circuitry for deriving 1830. Processing with circuitry for receiving 1815, circuitry for measuring 1820, circuitry for transmitting 1825, and circuitry for deriving 1830 may cause the communications device 1800 to perform the method 1500 described with respect to FIG. 15, or any aspect related to it.

Various components of the communications device 1800 may provide means for performing the method 1500 described with respect to FIG. 15, or any aspect related to it. For example, means for transmitting, sending or outputting for transmission may include transceivers 354 and/or antenna(s) 352 of the UE 104 illustrated in FIG. 3 and/or the transceiver 1865 and the antenna 1870 of the communications device 1800 in FIG. 18. Means for receiving or obtaining may include transceivers 354 and/or antenna(s) 352 of the UE 104 illustrated in FIG. 3 and/or the transceiver 1865 and the antenna 1870 of the communications device 1800 in FIG. 18.

FIG. 19 depicts aspects of an example communications device 1900. In some aspects, communications device 1900 is a network entity, such as BS 102 of FIGS. 1 and 3, or a disaggregated base station as discussed with respect to FIG. 2.

The communications device 1900 includes a processing system 1905 coupled to the transceiver 1945 (e.g., a transmitter and/or a receiver) and/or a network interface 1955. The transceiver 1945 is configured to transmit and receive signals for the communications device 1900 via the antenna 1950, such as the various signals as described herein. The network interface 1955 is configured to obtain and send signals for the communications device 1900 via communication link(s), such as a backhaul link, midhaul link, and/or fronthaul link as described herein, such as with respect to FIG. 2. The processing system 1905 may be configured to perform processing functions for the communications device 1900, including processing signals received and/or to be transmitted by the communications device 1900.

The processing system 1905 includes one or more processors 1910. In various aspects, one or more processors 1910 may be representative of one or more of receive processor 338, transmit processor 320, TX MIMO processor 330, and/or controller/processor 340, as described with respect to FIG. 3. The one or more processors 1910 are coupled to a computer-readable medium/memory 1925 via a bus 1940. In certain aspects, the computer-readable medium/memory 1925 is configured to store instructions (e.g., computer-executable code) that when executed by the one or more processors 1910, cause the one or more processors 1910 to perform the method 1600 described with respect to FIG. 16, or any aspect related to it. Note that reference to a processor of communications device 1900 performing a function may include one or more processors 1910 of communications device 1900 performing that function.

In the depicted example, the computer-readable medium/memory 1925 stores code (e.g., executable instructions), such as code for transmitting 1930 and code for receiving 1935. Processing of the code for transmitting 1930 and code for receiving 1935 may cause the communications device 1900 to perform the method 1600 described with respect to FIG. 16, or any aspect related to it.

The one or more processors 1910 include circuitry configured to implement (e.g., execute) the code stored in the computer-readable medium/memory 1925, including circuitry such as circuitry for transmitting 1915 and circuitry for receiving 1920. Processing with circuitry for transmitting 1915 and circuitry for receiving 1920 may cause the communications device 1900 to perform the method 1600 as described with respect to FIG. 16, or any aspect related to it.

Various components of the communications device 1900 may provide means for performing the method 1600 as described with respect to FIG. 16, or any aspect related to it. Means for transmitting, sending or outputting for transmission may include transceivers 332 and/or antenna(s) 334 of the BS 102 illustrated in FIG. 3 and/or the transceiver 1945 and the antenna 1950 of the communications device 1900 in FIG. 19. Means for receiving or obtaining may include transceivers 332 and/or antenna(s) 334 of the BS 102 illustrated in FIG. 3 and/or the transceiver 1945 and the antenna 1950 of the communications device 1900 in FIG. 19.

EXAMPLE CLAUSES

Implementation examples are described in the following numbered clauses:

Clause 1: A method of wireless communication by an aggressor UE, comprising: receiving configuration information configuring the aggressor UE with at least one resource for transmitting precoded RS for CLI measurement by a victim UE; and transmitting the precoded RS on the resource.

Clause 2: The method of Clause 1, further comprising: transmitting a PUSCH using a same precoder as used when transmitting the precoded RS.

Clause 3: The method of Clause 2, wherein the configuration information configures the UE for transmitting multi-port CLI-SRS using the same precoder as PUSCH.

Clause 4: The method of Clause 3, wherein the UE transmits the multi-port CLI-SRS with power control, based on power control of the PUSCH.

Clause 5: The method of Clause 2, wherein: the configuration information configures the UE for transmitting multi-port RS using the same precoder as PUSCH; and the RS is transmitted using a same number of ports as the PUSCH.

Clause 6: The method of Clause 2, wherein the RS comprises PUSCH DMRSs with dynamic symbol positions.

Clause 7: The method of Clause 2, wherein: the RS is embedded in the PUSCH; and the RS embedded in the PUSCH is scrambled with a different scrambling ID than used for scrambling DMRSs.

Clause 8: The method of Clause 2, further comprising: receiving an indication, from a network entity, indicating that the aggressor UE is to precode the RS with a same precoder as the precoder used to transmit PUSCH.

Clause 9: The method of Clause 8, wherein the indication is transmitted as DCI.

Clause 10: The method of Clause 9, wherein the DCI indicates a TPMI for precoding the RSs and the PUSCH.

Clause 11: The method of Clause 10, wherein the aggressor UE is configured with rules for determining a TPMI to use for precoding RS on each of the multiple resources.

Clause 12: The method of Clause 8, wherein the indication is provided via RRC configuration.

Clause 13: The method of Clause 8, wherein the configuration information configures the aggressor UE with multiple resources, each associated with a RS transmitted for CLI measurement by the victim UE.

Clause 14: The method of Clause 13, wherein the rules allow a TPMI that is identity.

Clause 15: The method of Clause 2, further comprising: receiving an indication of an association between the precoded RS and a precoder for an upcoming PUSCH.

Clause 16: The method of Clause 15, wherein the association is provided via a SRI indicated via DCI.

Clause 17: The method of Clause 16, wherein RRC configuration indicates that the association is provided via SRI.

Clause 18: The method of Clause 15, wherein a default association is assumed if a DCI does not indicate an SRI.

Clause 19: The method of Clause 15, wherein: the aggressor is configured with multiple resources for transmitting precoded RS for CLI measurement by the victim UE; and each of the multiple resources is associated with a SRI.

Clause 20: The method of any one of Clauses 1-19, wherein: the precoded RS comprises SRS; and configuration information indicates a usage type of the SRS is for CLI measurement.

Clause 21: The method of any one of Clauses 1-20, wherein the resource is also used to transmit SRS for uplink channel measurement.

Clause 22: A method of wireless communication by a victim UE, comprising: receiving configuration information configuring the victim UE with one or more CLI measurement resources for measuring CLI SRS; measuring CLI based on SRS transmitted on the CLI measurement resources; and transmitting a report based on the measured CLI.

Clause 23: The method of Clause 22, wherein the configuration information configures the victim UE with one or more multi-port ZP-SRS resources for measurement of precoded CLI SRS.

Clause 24: The method of Clause 23, further comprising: deriving a CLI hypothesis based on measurements taken on each ZP-SRS resource.

Clause 25: The method of Clause 23, wherein the report includes explicit CLI measurements taken on the ZP-SRS resources.

Clause 26: The method of any one of Clauses 22-25, wherein the configuration information indicates one or more TPMIs.

Clause 27: The method of any one of Clauses 22-26, wherein: the configuration information configures the victim UE with multiple single port ZP-SRS resources for measurement of precoded CLI SRS; and the report indicates a CLI hypothesis based on measurements taken on the multiple single port ZP-SRS resources.

Clause 28: A method of wireless communication by a network entity, comprising: transmitting first configuration information configuring an aggressor UE with at least one resource for transmitting precoded RS for CLI measurement by a victim UE; transmitting second configuration information configuring the victim UE with one or more CLI measurement resources for measuring CLI SRS; and receiving a report, generated by the victim UE, based on measured CLI SRS.

Clause 29: The method of Clause 28, further comprising: receiving a PUSCH transmitted using a same precoder as used when transmitting the precoded RS.

Clause 30: The method of Clause 29, wherein the configuration information configures the UE for transmitting multi-port CLI-SRS using the same precoder as PUSCH.

Clause 31: The method of Clause 29, wherein the configuration information configures the aggressor UE for transmitting multi-port RS using the same precoder as PUSCH.

Clause 32: The method of Clause 29, further comprising: transmitting an indication that the aggressor UE is to precode the RS with a same precoder as the precoder used to transmit PUSCH.

Clause 33: The method of Clause 32, wherein the indication is transmitted as DCI.

Clause 34: The method of Clause 33, wherein the DCI indicates a TPMI for precoding the RSs and the PUSCH.

Clause 35: The method of Clause 34, wherein the aggressor UE is configured with rules for determining a TPMI to use for precoding RS on each of the multiple resources.

Clause 36: The method of Clause 32, wherein the indication is provided via RRC configuration.

Clause 37: The method of Clause 32, wherein the configuration information configures the aggressor UE with multiple resources, each associated with a RS transmitted for CLI measurement by the victim UE.

Clause 38: The method of Clause 29, further comprising: transmitting an indication of an association between the precoded RS and a precoder for an upcoming PUSCH.

Clause 39: The method of Clause 38, wherein the association is provided via a SRI indicated via DCI.

Clause 40: The method of Clause 38, wherein RRC configuration indicates that the association is provided via SRI.

Clause 41: The method of Clause 38, wherein: the aggressor is configured with multiple resources for transmitting precoded RS for CLI measurement by the victim UE; and each of the multiple resources is associated with a SRI.

Clause 42: The method of any one of Clauses 28-41, wherein the configuration information configures the victim UE with one or more multi-port ZP-SRS resources for measurement of precoded CLI SRS.

Clause 43: The method of Clause 42, wherein the report includes explicit CLI measurements taken on the ZP-SRS resources.

Clause 44: The method of any one of Clauses 28-43, wherein the configuration information indicates one or more TPMIs.

Clause 45: The method of any one of Clauses 28-44, wherein: the configuration information configures the victim UE with multiple single port ZP-SRS resources for measurement of precoded CLI SRS; and the report indicates a CLI hypothesis based on measurements taken on the multiple single port ZP-SRS resources.

Clause 46: An apparatus, comprising: a memory comprising executable instructions; and a processor configured to execute the executable instructions and cause the apparatus to perform a method in accordance with any one of Clauses 1-45.

Clause 47: An apparatus, comprising means for performing a method in accordance with any one of Clauses 1-45.

Clause 48: A non-transitory computer-readable medium comprising executable instructions that, when executed by a processor of an apparatus, cause the apparatus to perform a method in accordance with any one of Clauses 1-45.

Clause 49: A computer program product embodied on a computer-readable storage medium comprising code for performing a method in accordance with any one of Clauses 1-45.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by an aggressor user equipment (UE), comprising:
   receiving configuration information configuring the aggressor UE with at least one resource for transmitting precoded reference signals (RS) for cross link interference (CLI) measurement by a victim UE;
   transmitting the precoded RS on the resource; and
   subsequent to transmitting the precoded RS, transmitting a physical uplink shared channel (PUSCH) using a same precoder as used when transmitting the precoded RS, and wherein the precoded RS comprises PUSCH demodulation reference signals (DMRSs) with dynamic symbol positions.

2. The method of claim 1, wherein:
   the configuration information configures the UE for transmitting multi-port CLI sounding reference signals (CLI-SRS) using the same precoder as the PUSCH.

3. The method of claim 2, wherein the UE transmits the multi-port CLI-SRS with power control, based on power control of the PUSCH.

4. The method of claim 1, wherein:
   the configuration information configures the UE for transmitting multi-port RS using the same precoder as the PUSCH; and
   the RS is transmitted using a same number of ports as the PUSCH.

5. The method of claim 1, wherein:
   the RS is embedded in the PUSCH; and
   the RS embedded in the PUSCH is scrambled with a different scrambling ID than used for scrambling demodulation reference signals (DMRSs).

6. The method of claim 1, further comprising receiving an indication, from a network entity, indicating that the aggressor UE is to precode the RS with a same precoder as the precoder used to transmit the PUSCH.

7. The method of claim 6, wherein the indication is transmitted as downlink control information (DCI).

8. The method of claim 6, wherein the indication is provided via radio resource control (RRC) configuration.

9. The method of claim 7, wherein the DCI indicates a Transmitted Precoding Matrix Indicator (TPMI) for precoding the RSs and the PUSCH.

10. The method of claim 6, wherein the configuration information configures the aggressor UE with multiple resources, each associated with a RS transmitted for CLI measurement by the victim UE.

11. The method of claim 10, wherein:
   the aggressor UE is configured with rules for determining a TPMI to use for precoding RS on each of the multiple resources.

12. The method of claim 10, wherein the rules allow a TPMI that is identity.

13. The method of claim 1, wherein:
   the precoded RS comprises sounding reference signals (SRS); and
   configuration information indicates a usage type of the SRS is for CLI measurement.

14. The method of claim 1, further comprising:
   receiving an indication of an association between the precoded RS and a precoder for an upcoming PUSCH.

15. The method of claim 14, wherein the association is provided via a sounding reference signal (SRS) resource identifier (SRI) indicated via downlink control information (DCI).

16. The method of claim 15, wherein radio resource control (RRC) configuration indicates that the association is provided via SRI.

17. The method of claim 14, wherein a default association is assumed if a DCI does not indicate an SRI.

18. The method of claim 14, wherein:
   the aggressor is configured with multiple resources for transmitting precoded RS for CLI measurement by the victim UE; and
   each of the multiple resources is associated with a sounding reference signal (SRS) resource identifier (SRI).

19. The method of claim 1, wherein the resource is also used to transmit sounding reference signals (SRS) for uplink channel measurement.

20. A method of wireless communication by a victim user equipment (UE), comprising:
- receiving configuration information configuring the victim UE with one or more CLI measurement resources for measuring cross link interference (CLI) sounding reference signals (SRS), wherein the configuration information indicates one or more Transmitted Precoding Matrix Indicators (TPMIs) for SRS transmitted on the one or more CLI measurement resources;
- measuring CLI based on SRS transmitted on the CLI measurement resources; and
- transmitting a report based on the measured CLI.

21. The method of claim 20, wherein the configuration information configures the victim UE with one or more multi-port zero power SRS (ZP-SRS) resources for measurement of precoded CLI SRS.

22. The method of claim 21, further comprising:
- deriving a CLI hypothesis based on measurements taken on each ZP-SRS resource.

23. The method of claim 21, wherein the report includes explicit CLI measurements taken on the ZP-SRS resources.

24. The method of claim 20, wherein:
- the configuration information configures the victim UE with multiple single port zero power SRS (ZP-SRS) resources for measurement of precoded CLI SRS; and
- the report indicates a CLI hypothesis based on measurements taken on the multiple single port ZP-SRS resources.

25. A method of wireless communication by a network entity, comprising:
- transmitting first configuration information configuring an aggressor user equipment (UE) with at least one resource for transmitting precoded reference signals (RS) for cross link interference (CLI) measurement by a victim UE, wherein the first configuration information includes information identifying a precoder for the aggressor UE to use for transmitting the precoded RSs and a subsequent physical uplink shared channel (PUSCH), and wherein the precoded RS comprises PUSCH demodulation reference signals (DMRSs) with dynamic symbol positions;
- transmitting second configuration information configuring the victim UE with one or more CLI measurement resources for measuring CLI SRS; and
- receiving a report, generated by the victim UE, based on measured CLI SRS.

26. The method of claim 25, further comprising receiving the PUSCH transmitted using a same precoder as used when transmitting the precoded RS.

27. The method of claim 26, wherein:
- the configuration information configures the UE for transmitting multi-port CLI sounding reference signals (CLI-SRS) using the same precoder as the PUSCH.

* * * * *